US010608780B2

(12) United States Patent
Angelopoulos et al.

(10) Patent No.: US 10,608,780 B2
(45) Date of Patent: Mar. 31, 2020

(54) METHODS, APPARATUS AND SYSTEMS FOR TRANSMISSION AND RECEPTION OF SPARSE SIGNALS IN WIRELESS SENSOR NETWORKS

(71) Applicant: Massachusetts Institute of Technology, Cambridge, MA (US)

(72) Inventors: Georgios Angelopoulos, Cambridge, MA (US); Muriel Medard, Belmont, MA (US); Anantha Chandrakasan, Belmont, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 510 days.

(21) Appl. No.: 15/423,445

(22) Filed: Feb. 2, 2017

(65) Prior Publication Data

US 2017/0222753 A1     Aug. 3, 2017

Related U.S. Application Data

(60) Provisional application No. 62/290,113, filed on Feb. 2, 2016.

(51) Int. Cl.
*H04L 1/00*     (2006.01)
*H04L 29/08*     (2006.01)
*H04L 27/34*     (2006.01)

(52) U.S. Cl.
CPC .......... *H04L 1/0043* (2013.01); *H04L 1/0009* (2013.01); *H04L 67/12* (2013.01); *H04L 27/3405* (2013.01)

(58) Field of Classification Search
CPC combination set(s) only.
See application file for complete search history.

(56) References Cited

U.S. PATENT DOCUMENTS 6,426,972 B1 * 7/2002 Endres et al.
10,129,687 B2 * 11/2018 Mittal et al.
2010/0082302 A1 * 4/2010 Garudadri et al.

OTHER PUBLICATIONS

Aeron et al., "Information theoretic bounds for Compressed Sensing," *IEEE Transactions on Information Theory*, vol. 56 (2010):5111-5130.

(Continued)

*Primary Examiner* — Marsha D Banks Harold
*Assistant Examiner* — Dharmesh J Patel
(74) *Attorney, Agent, or Firm* — Smith Baluch LLP

(57) ABSTRACT

Efficient and reliable transmission of information from sparse sources over wireless channels in wireless signal networks (WSNs). WSN nodes employ an "integrated signal representation-to-modulation" scheme to describe a sparse signal acquired from a sensor so as to ensure robustness against channel errors across a wide range of signal to noise (SNR) values in a rateless fashion. In one example, sparse signal samples are linearly transformed such that the total number of bits representing the sparse signal is reduced. The linearly-transformed signal samples are directly mapped to a modulation constellation to provide a succession of modulation symbols. A carrier wave is modulated in phase and/or frequency according to the succession of the modulation symbols to generate an encoded carrier wave representing the sparse analog signal. In one aspect, an order of the modulation constellation is based on the precision (e.g., number of bits) of each of the linearly-transformed signal samples.

29 Claims, 14 Drawing Sheets

(56) References Cited

OTHER PUBLICATIONS

Angelopoulos et al., "PRAC: Exploiting partial packets without cross-layer or feedback information," *IEEE International Conference on Communications*(2014):5802-5807.
Angelopoulos et al., "AdaptCast: An Integreated source to transmission scheme for wireless sensor netowrks," *IEEE International Conference on Communications*(2015).
Balakrishnan et al., "Performance Analysis of Error Control Codes for Wireless Sensor Networks," *Fourth International Conference on Information Technology*, (2007).
Bicket et al., "Bit-rate selection in wireless networks," Masters Thesis, MIT (2005).
Blumensath et al., "Iterative hard thresholding for compressed sensing," *CoRR*(2008).
Borade et al., "Unequal Error Protection: An Information Theoretic Perspective," *IEEE Transactions on Information Theory*, vol. 55 (2009):5511-5539.
Candes et al., "Decoding by linear programming" *IEEE Transactions on Information Theory*, vol. 51 (2005):4203-4215.
Candes et al., "Near Optimal Signal Recovery From Random Projections: Universal Encoding Strategies?" *IEEE Transactions on Information Theory*, vol. 52 (2006):5406-5425.
Candes et al., "The Dantzig selector: Statistical estimation when p is much larger than n," *The Annals of Statistics*, vol. 35 (2007):2313-2351.
Candes et al., "An Introduction to Compressive Sampling," *IEEE Signal Processing Magazine*(2008): 21-30.
Candes et al., "How well can we estimate a sparse vector?" *Applied and Computational Harmonic Analysis*, vol. 34 (2013):317-323.
Chatzigeorgiou et al., "Design and Evaluation of an In-Pipe Leak Detection Sensing Technique Based on Force Transduction," *ASME 2012 International Mechanical Engineering Congress and Exposition*, vol. 4 (2012):489-497.
Chen et al., "Energy-Aware Design of Compressed Sensing Systems for Wireless Sensors Under Performance and Reliability Constraints," *IEEE Transactions on Circuits and Systems—I: Regular Papers*, vol. 60 (2013):650-661.
Chen et al., "Channel Capacity under Sub-Nyquist Nonuniform Sampling," *IEEE Transactions on Information Theory*, vol. 60 (2014):4739-4756.
Csiszar, "On the error exponent of source-channel transmission with a distortion threshold," *IEEE Transactions on Information Theory*, vol. 28 (1982):823-828.
Davis et al., "A Two-Stage Template Approach to Person Detection in Thermal Imagery," *Application of Computer Vision, Seventh IEEE Workshops on.*, vol. 1 (2005):361-369.
Donoho, "Compressed sensing," *IEEE Transactions on Information Theory*, vol. 52 (2006):1289-1306.
Donoho et al., "Sparse Solution of Underdetermined Linear Equations by Stagewise Orthogonal Matching Pursuit," *Technical Report*, No. 2006-2 (2006).
Dubois-Ferriere et al., "Packet combining in sensor networks" *ACM SenSys*(2005).
Erez et al., "Rateless Coding for Gaussian Channels," *IEEE Transactions on Information Theory*, vol. 58 (2012):530-547.
Evans, "How the next evolution of the internet is changing everything," *Cisco IBSG*(2011):1-11.
Fan et al., "Distributed Wireless Visual Communication with Power Distortion Optimization," *IEEE Transactions on Circuits and Systems for Video Technology*, vol. 23 (2013):1040-1053.
Goyal, "Theoretical Foundations of Transform Coding," *IEEE Signal Processing Magazine*, vol. 18 (2001):9-21.
Goyal et al., "Compressive Sampling and Lossy Compression," *IEEE Signal Processing Magazine*, vol. 25 (2008):48-56.
Haganauer, "Source-controlled channel decoding," *IEEE Transactions on Information Theory*, vol. 43 (1995):2449-2457.
Holland et al., "Optimizing physical layer parameters for wireless sensor networks," *ACM Transactions on Sensor Networks*, vol. 7 (2011).
Howard et al., Error Control Coding in Low-Power Wireless Sensor Networks: When is ECC Energy-Efficient? *EURASIP Journal on Wireless Communications and Networking*, (2006).
Isaka et al., "Multilevel Coded Modulation for Unequal Error Protection and Multistage—Part II: Asymmetric Constellations," *IEEE Transactions on Communication*, vol. 48 (2000):204-213.
Jain et al., "Energy Distortion Tradeoffs in Gaussian Joint Source-Channel Coding Problems," *IEEE Transactions on Information Theory*, vol. 58 (2012):3153-3168.
Jakubczak et al., "SoftCast: One-Size-Fits-All Wireless Video," *ACM SIGCOMM*(2010).
Jakubczak et al., "A Cross-Layer Design for Scalable Mobile Video" *International Conference on Mobile Computing and Networking, MobiCom*(2011).
Jalaleddine et al., "ECG data compression techniques—a unified approach," *IEEE Transactions on Biomedical Engineering*, vol. 37 (1990):329-343.
Kim et al., "Wavelet-based low-delay ECG compression algorithm for continuous ECG transmission," *IEEE Transactions on InformationTechnology in Biomedicine*, vol. 10 (2006):77-83.
Kostina et al., Lossy Joint Source-Channel Coding in the Finite Blocklength Regime,*IEEE Transactions on Information Theory*, vol. 59 (2013):2545-2575.
Mallat et al., "Matching Pursuits With Time-Frequency Dictionaries," *IEEE Transactions on Signal Processing*, vol. 41 (1993):3397-3415.
Needell et al., "CoSaMP: Iterative Signal Recovery From Incomplete and Inaccurate Samples," *Applied and Computational Harmonic Analysis*, vol. 26 (2009):301-321.
Needell et al., "Uniform Uncertainty Principle and Signal Recovery Via Regularized Orthogonal Matching Pursuit," *Foundations of Computational Mathematics*, vol. 9 (2009):317-334.
Nyquist, "Certain Topics in Telegraph Transmission Theory," *Transactions of the American Institute of Electrical Engineers*, vol. 47 (1928):617-644.
Perry et al., "Spinal Codes," *ACM SIGCOMM*(2012).
Prabhakaran et al., "Hybrid Digital-Analog Codes for Source-Channel Broadcast of Gaussian Sources over Gaussian Channels," *IEEE Transactions on Information Theory*, vol. 57 (2011):4573-4588.
Prades-Nebot et al., "Distributed video coding using compressive sampling," *Picture Coding Symposium*(2009):1-4.
Ramchandran et al., "Multiresolution Broadcast for Digital HDTV Using Joint Source/Channel Coding," *IEEE Journal on Selected Areas in Communications*, vol. 11 (1993):6-23.
Reeves et al., "Approximate Sparsity Pattern Recovery: Information-Theoretic Lower Bounds," *IEEE Transactions on Information Theory*, vol. 59 (2013):3451-3465.
Rosenthal et al., "On the epsilon entropy of mixed random variables," *IEEE Transactions on Information Theory*, vol. 34 (1988):1110-1114.
Sameni et al., "A Nonlinear Bayesian Filtering Framework for ECG Denoising," *IEEE Transactions on Biomedical Engineering*, vol. 54 (2007):2172-2185.
Sen et al., "Design and Implementation of and "Approximate" Communication System for Wireless Media Applications," *IEEE/ACM Transactions on Networking*, vol. 21 (2013):1035-1048.
Shannon, "A Mathematical Theory of Communication," *The Bell System Technical Journal*, vol. 27 (1948): 379-423, 623-656.
Soundararajan et al., "Hybrid Coding for Gaussian Broadcast Channels with Gaussian Sources," *IEEE international conference on Symposium on Information Theory*(2009):2790-2794.
Starck et al., "The Curvelet Transform for Image Denoising," *IEEE Transactions on Image Processing*, vol. 11 (2002):670-684.
Vutukuru et al., "Cross-layer wireless bit rate adaption," *ACM SIGCOMM*(2009).
Weidmann et al., "Rate Distortion Behavior of Sparse Sources," *IEEE Transactions on Information Theory*, vol. 58 (2012):4969-4992.

(56) References Cited

OTHER PUBLICATIONS

Zhong et al., "On the Joint Source-Channel Coding Error Component for Discrete Memoryless Systems," *IEEE Transactions on Information Theory*, vol. 52 (2006):1450-1468.

* cited by examiner

METHODS, APPARATUS AND SYSTEMS FOR TRANSMISSION AND RECEPTION OF SPARSE SIGNALS IN WIRELESS SENSOR NETWORKS

CROSS-REFERENCE TO RELATED APPLICATION(S)

This application claims the priority benefit under 35 U.S.C. 119(e) of U.S. provisional application Ser. No. 62/290,113, filed on Feb. 2, 2016 and entitled "EFFICIENT AND RELIABLE TRANSMISSION OF SPARSE SIGNALS IN WIRELESS SENSOR NETWORKS," which application is hereby incorporated by reference herein in its entirety.

BACKGROUND

Wireless sensor networks (WSNs) have been an emerging technology over the last decade and are expected to have major societal, environmental and financial impacts over the next few years, with more than 50 million interconnected nodes worldwide by 2020. The rapidly increasing range of applications for WSNs includes continuous human health tracking, smart buildings automation and monitoring of industrial infrastructures.

WSNs typically include multiple spatially-distributed autonomous sensors to monitor physical or environmental conditions, such as temperature, sound, and pressure, amongst others. The sensors in a WSN cooperatively pass their data through the network to a primary location. In some examples a WSN may be bi-directional to facilitate control of multiple spatially-distributed actuators, in tandem with receiving information on physical or environmental conditions from spatially-distributed sensors. FIGS. 1A through 1D illustrate various examples of Wireless Sensor Networks (WSNs), including a body area network (FIG. 1A), a smart building network (FIG. 1B), a smart city network (FIG. 1C), and an industrial network (FIG. 1D).

FIG. 2 illustrates a general example of a WSN that includes multiple nodes 50 coupled to a gateway 60, which is in turn coupled to a central controller or monitoring computer 70. A WSN may include relatively few nodes to several hundreds or even thousands of nodes, where each node is connected to one (or sometimes several) other nodes. FIG. 3 illustrates a general example of a WSN node 50; as can be seen in FIG. 3, a node 50 may include a signal acquisition controller 52 (e.g., an electronic circuit for interfacing with a sensor), signal processing logic 54 (e.g., to process signals derived from a sensor and acquired by the signal acquisition controller), a communications interface 56 (e.g., a radio transceiver with an internal antenna or connection to an external antenna), and an energy source 58 (e.g., a battery or an embedded form of energy harvesting). For those nodes that may also have a controlling function for an actuator, the node may include actuation logic/circuitry 59. In various implementations, sensor nodes may vary significantly in physical size and cost, depending on the complexity of the individual sensor nodes. Size and cost constraints on sensor nodes result in corresponding constraints on resources such as energy, memory, computational speed and communications bandwidth.

Although different WSNs exhibit diverse requirements in terms of expected latency, throughput, energy consumption, and other aspects, a majority of these networks captures compressible analog signals at respective nodes, and aims to transmit signals reliably to one or more nodes, while maintaining low power consumption. Thus, currently, two of the main technical challenges of WSNs are achieving required communications reliability under delay constraints in usually harsh environments, and limiting their power consumption to ensure extended lifetime.

FIG. 4 illustrates, in block diagram format, a comparison of three different conventional approaches for WSN node design to acquire sparse signals, compress the acquired signals, and modulate RF carriers.

For example, the node 50(a) shown in FIG. 4 implements a common layered approach for transmission of information in WSNs, justified by Nyquist's sampling criterion and Shannon's separation theorem, in which signal acquisition (via analog-to-digital converter ADC), compression of sources (source coding), and reliable information transmission (channel coding) are decoupled. Source coding techniques compress acquired data by transforming them to other domains and/or exploiting statistical source properties. Channel coding techniques insert redundancy in transmitted data for increased communications reliability in the presence of channel noise, and their incorporation in WSNs is considered in numerous works. Most conventional PHY forward error correction (FEC) channel coding schemes operate without knowledge of the source, protecting equally every bit. Unequal error protection (UEP) schemes weight the assignment of additional resources, e.g. power, frequency or rate redundancy, to each bit depending on its relative importance, but their adoption in WSNs is limited, mainly due to the high computational complexity and application specific nature of UEP schemes.

Rapid fluctuations in the quality of a wireless medium (e.g., caused by such factors as environmental mobility and external interference) often deteriorate performance of channel coding schemes with fixed coding rate, resulting in a behavior usually known as "threshold effect." Channel estimation and rate adaptation techniques partially address this behavior by adjusting transmission parameters depending on the experienced channel, but they are limited by the fundamental trade-off of channel quality tracking versus transmission signal energy. In some instances, rateless coding schemes have been proposed as an alternative approach without requiring feedback information, while in other proposals some cross-layer schemes provide a wider range of operational channel SNR.

Node 50(b) in FIG. 4 illustrates another conventional approach involving joint source-channel coding (JSCC) schemes. These schemes simultaneously compress and enhance the reliability of the acquired information against channel errors. In certain scenarios, these schemes may achieve superior performance compared to layered coding schemes (as illustrated by the node 50(a)), or the same performance but with significantly less delay and complexity. For instance, in the non-asymptotic regime, it has been shown that the error exponent of JSCC outperforms layered coding, and considerable advantages are associated with it in point-to-point and multiuser scenarios. Although these schemes might guarantee gracefully degrading quality of received information and lower complexity than the layered approach, they are usually signal-specific approaches and require fully analog or hybrid systems with several implementation challenges.

Node 50(c) in FIG. 4 illustrates yet another conventional approach involving "compressed sensing." Because a plethora of naturally occurring signals (e.g., images and human biosignals), as well as several signals in practical systems (e.g., radio frequency (RF) signals in wireless receivers), exhibit high sparsity levels or can be sufficiently approximated by sparse models, researchers have proposed specific coding schemes to represent and efficiently process efficiently sparse signals. Generally speaking, a sparse signal is a signal that can be represented, in at least one domain (e.g., time domain, frequency domain), by a few representation coefficients (e.g., significantly fewer than the signal's dimensionality).

Compressed sensing (CS) is such a scheme for efficient acquisition of sparse signals, based on random projections and incoherent sampling. Although most nodes with CS acquisition, as the node 50(c) in FIG. 4, have several advantages, e.g., signal independent operation and lower complexity, they inherit the typical limitations of PHY FEC schemes, require channel state information (CSI) for appropriate rate selection and do not perform well in multiuser scenarios.

SUMMARY

The Inventors have recognized and appreciated that some of the main challenges and drawbacks associated with the prevailing acquisition, source and channel coding techniques employed in conventional nodes of WSNs, as shown by the nodes 50(a), 50(b), and 50(c) in FIG. 4, are the following:

Signal-specific assumptions: A vast majority of compression techniques and JSCC schemes are tailored and customized to a specific signal model, preventing its use across multiple applications.

"Threshold effect": Practical PHY FEC schemes exhibit an all-or-nothing behavior, operating very well in a point-to-point channel of known SNR, but poorly in a more challenged environment.

Limited performance in multiuser scenarios: Coding and transmitting information at a rate limited to the worst receiver, which is the prevailing approach for multiuser transmission in WSNs, and not serving each node at a rate commensurate with its channel quality and processing capabilities, severely impacts the total network performance.

Feedback and CSI requirements: Instantaneous and perfect feedback increases the system requirements in terms of transmitted information and available resources, making its incorporation and implementation in WSNs a challenging, and sometimes impractical task.

To formulate effective solutions to the above-noted challenges, the Inventors have also recognized and appreciated that, although different WSN applications exhibit diverse requirements, a majority of them require nodes that capture analog signals and quantize these signals to a certain precision, and then transmit the quantized signals to one or more other nodes with little distortion while maintaining low power consumption. Furthermore, most of the signals in WSNs are represented by numbers of fixed precision, can be compressed, with high sparsity levels, and can tolerate some distortion during their communication (depending on the application). Accordingly, although various conventional node designs tend to consider signal transmission in a manner similar to that of transmitting digital files over the Internet, the Inventors have recognized and appreciated that the above-noted conditions implicated by many WSN implementations facilitate alternative solutions for improved signal transmission.

In view of the foregoing, various inventive implementations disclosed herein relate generally to the efficient and reliable transmission of sparse sources over wireless channels. These implementations provide significant technological improvements to conventional wireless sensor networks (WSNs), at least in part by addressing the strict reliability and power consumption constraints of such networks. The Inventors have developed the various inventive technological concepts (e.g., methods and apparatus) disclosed herein, generally referred to as "AdaptCast," in part based on the recognition of the prevalence of sparse physical signals in WSNs.

As discussed in greater detail below, in some examples of AdaptCast, a physical layer (PHY) "integrated signal representation-to-modulation scheme" parsimoniously describes the information carried by sparse physical signals in a WSN and ensures sufficient robustness against channel errors across a wide range of signal-to-noise (SNR) values in a rateless fashion. In one aspect, the integrated signal representation-to-modulation scheme involves a direct bit-importance-preserving modulation mapping. As a result, the robust performance of AdaptCast is maintained even when there is a sudden degradation in the tradeoff between distortion and SNR of rated channel coding schemes, further owing to AdaptCast's denoising reconstruction algorithm. Through rate-distortion analysis, AdaptCast is shown to be asymptotically optimal in terms of distortion in the high SNR regime in point-to-point links. Simulation results demonstrate that AdaptCast is applicable to a wide range of applications and performs close to an idealized layered transmission scheme in terms of reliability and end-to-end distortion.

In sum, one inventive implementation is directed to a wireless sensor node, comprising: an analog-to-digital converter (ADC) to sample a sparse analog signal representing at least one sensed condition and generate a plurality of digital samples; a controller, coupled to the ADC, to receive and process the plurality of digital samples by: A) applying a transformation to a first number N of the plurality of digital samples to provide a second number M of measurement coefficients, wherein: the first number N of the plurality of digital samples comprise a first total number of bits; and the second number M of the plurality of measurement coefficients comprise a second total number of bits less than the first total number of bits; B) mapping the M measurement coefficients to respective constellation points of a modulation constellation having an order that is based on each of the M measurement coefficients so as to generate a succession of modulation symbols corresponding to the respective constellation points; and C) modulating a phase and/or a frequency of a carrier wave, having a carrier frequency in a wireless communication spectrum, according to the succession of modulated symbols to generate an encoded carrier wave representing the sparse analog signal; and a communication interface, coupled to the controller, to transmit the encoded carrier wave generated in C).

Another inventive implementation is directed to a wireless sensor node, comprising: an analog-to-digital converter (ADC) to sample a sparse analog signal representing at least one sensed condition and generate a plurality of digital samples; and a controller, coupled to the ADC, to receive and process the plurality of digital samples to represent the digital samples as a succession of modulation symbols, wherein: the succession of modulation symbols preserves a relative bit importance of respective digital samples of the plurality of digital samples; and the controller modulates a carrier wave according to the succession of modulated symbols to generate an encoded carrier wave representing the sparse analog signal.

Another inventive implementation is directed to a method for transforming a sparse analog signal representing at least one sensed condition for transmission in a wireless sensor network, the method comprising: A) sampling the sparse analog signal to generate a plurality of digital samples; B) processing the plurality of digital samples to represent the digital samples as a succession of modulation symbols, wherein the succession of modulation symbols preserves a relative bit importance of respective digital samples of the plurality of digital samples; and C) modulating a carrier wave according to the succession of modulated symbols to generate an encoded carrier wave representing the sparse analog signal.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

DETAILED DESCRIPTION

Following below are more detailed descriptions of various concepts related to, and embodiments of, inventive systems, methods and apparatus for transmission and reception of sparse signals in wireless sensor networks. It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes.

Figure 5:
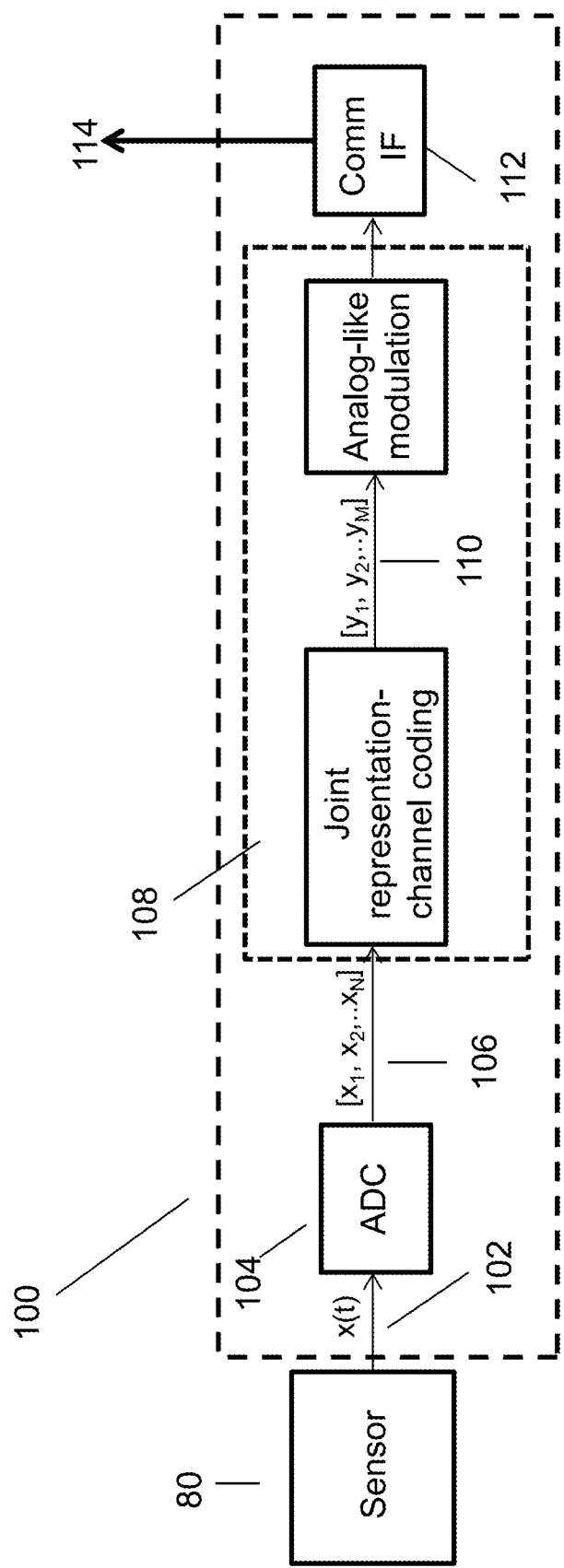
FIG. 5 illustrates a block diagram of a WSN node, according to one inventive implementation.

FIG. 5 illustrates a wireless sensor network (WSN) node 100, according to one inventive implementation. The WSN node 100 of FIG. 1 includes an analog-to-digital converter (ADC) 104 to sample a sparse analog signal 102 (x(t)) representing at least one sensed condition (e.g., the sparse analog signal 102 may be generated by a sensor 80). The ADC 104 generates a plurality of digital samples 106 ([$x_1$, $x_2$, ... $x_N$]), which are in turn processed by a controller 108. As indicated in the block diagram of FIG. 5, the controller 108 implements joint representation-channel coding, and an analog-like modulation scheme, to generate an encoded carrier wave 114 representing the sparse analog signal. The node 100 also includes a communication interface 112, coupled to the controller, to transmit the encoded carrier wave 114 from the node 100.

In the controller 108 of the node 100 of FIG. 5, in one aspect the joint representation-channel coding functionality uses concepts from compressed sensing (CS) to take advantage of the inherent sparsity in physical signals and efficiently represent the captured information without assuming a detailed signal model. In another aspect, the analog-like modulation functionality may employ dense modulation constellations, coupled with a relative bit importance and distance preserving modulation mapping. Based on the synergistic operation of these two functionalities, the node 100 exhibits the following characteristics: (i) it is application and signal model independent, (ii) it provides graceful degradation in signal distortion as channel quality degrades, (iii) it can simultaneously serve multiple receivers at their highest possible information rate, and (iv) it operates in a rateless fashion without requiring channel estimation and feedback for rate selection. As noted above, the methods and apparatus disclosed herein that implement the synergistic operation of joint representation-channel coding and analog-like modulation are referred to herein as "AdaptCast."

Figure 6:
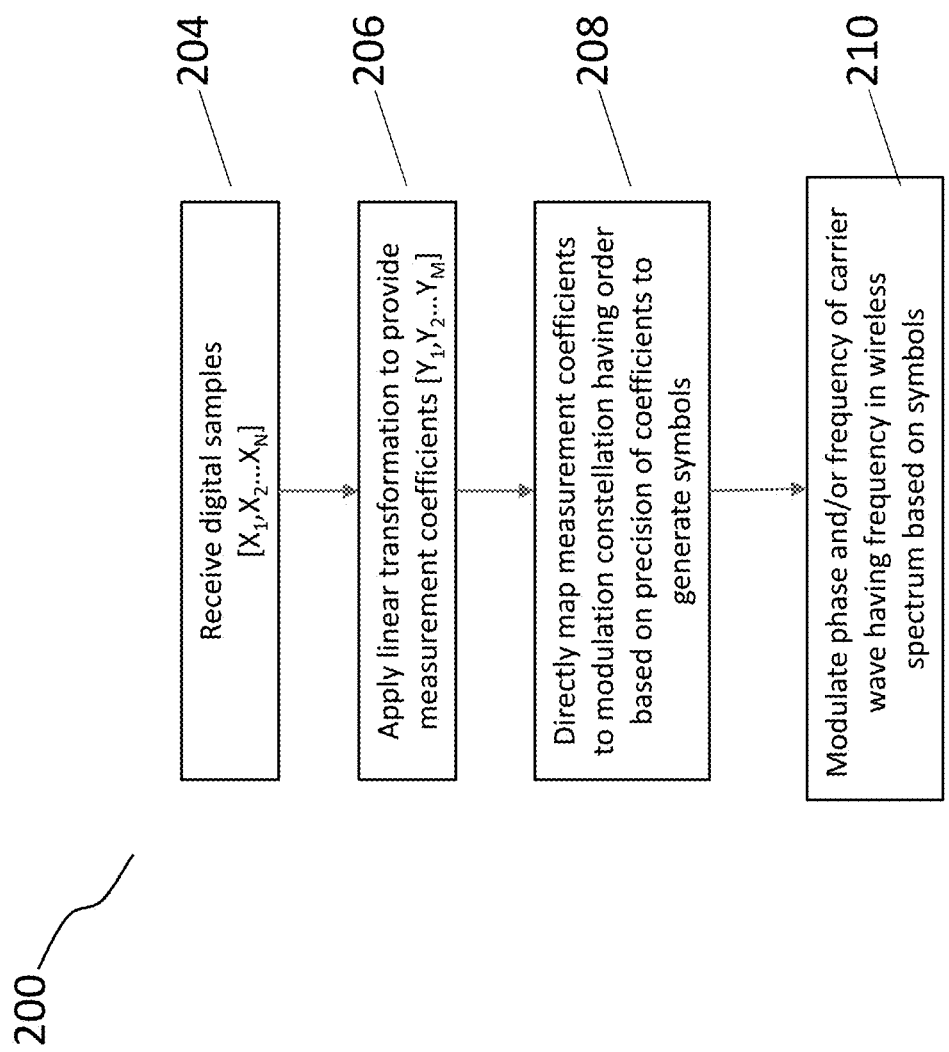
FIG. 6 illustrates a flow diagram of a signal processing method performed by the WSN node of FIG. 5, according to one inventive implementation.

FIG. 6 illustrates a flow diagram of a signal processing method 200 performed by the WSN node 100 of FIG. 5 and representing AdaptCast, according to one inventive implementation. In block 204 of FIG. 6, the controller 108 of the node 100 receives the plurality of digital samples [$x_1$, $x_2$, ... $x_N$] from the ADC 104 and, in one aspect, each of these digital samples has a first number $b_1$ of bits. In block 206, the controller processes the plurality of digital samples by applying a linear transformation to a first number N of the plurality of digital samples to provide a second number M of measurement coefficients [$y_1$, $y_2$, ... $y_M$] (shown as 110 in FIG. 5), wherein M<N. In one aspect of this linear transformation, each measurement coefficient has a second number $b_2$ of bits, wherein $M*b_2<N*b_1$ (i.e., the total number of bits to represent the sparse signal after the linear transformation is less than the number of bits representing the sparse signal before the linear transformation). In block 208, the controller 108 maps the M measurement coefficients to respective constellation points of a modulation constellation having an order that is based on the second number $b_2$ of bits of each of the M measurement coefficients (i.e., a "precision" of the measurement coefficients) so as to generate a succession of modulation symbols corresponding to the respective constellation points. In block 210, a carrier wave having a carrier frequency in a wireless communication spectrum is modulated in phase and/or frequency according to the succession of modulated symbols to generate the encoded carrier wave 114 representing the sparse analog signal.

Notation and System Architecture:

This section introduces the notation used across the rest of the paper and describes AdaptCast's fundamental ideas and main building blocks.

Notation and Source Model:

Consider a memoryless source X which emits an i.i.d. sequence of random variables $X_1$, $X_2$, ..... Let $x \in R^n$ represent a vector of n source realizations, where $x=\{x_1, x_2, ..., x_n\}$. We will refer to x as the source signal and $x_i$ as its $i^{th}$ component or coefficient. In our analysis, we consider a high dimensional setting in which $n \to \infty$ and examine the asymptotic performance of the various coding schemes, while, in our simulations, n is finite. We define signal sparsity density (p) as the ratio $$p = \frac{k}{n}, \quad (1)$$

and based on its value, we identify two regimes: (i) linear regime, where $p \xrightarrow{n \to \infty} (0,1)$, and (ii) sublinear regime, where $p \xrightarrow{n \to \infty} 0$.

Definition 1:

A source signal $x \in R^n$ is a strictly k-sparse signal ($x \in \Sigma_k(p)$) if it has at most k non-zero coefficients in a transformation domain defined by an orthogonal matrix $\Psi \in R^{n \times n}$ $$x \in \Sigma_k(p)\{x = \Psi\theta : \theta \in R^n \text{ and } \|\theta\|_0 \leq kk\}, \quad (2)$$

where $\|\cdot\|_0$ is the $l_0$-norm and denotes the number of nonzero components of a signal.

Several models for the amplitude of non-zero coefficients have been proposed in the literature, e.g. power laws and Laplacian models. In this work, we assume that they are realizations of i.i.d. Gaussian random variables, mainly because it provides a worst-case analysis in terms of minimum square error, but also for practical and tractability purposes.

Definition 2:

A source signal $x \in R^n$ is a Gaussian k-sparse signal ($x \in G_k(p, \sigma_x^2)$) if (i) x is strictly k-sparse, (ii) the position of the k non-zero coefficients is uniformly selected out of the $$\binom{n}{k}$$

possibilities and (iii) their magnitude is an i.i.d. random variable, drawn from the normal distribution $$x \in G_k(p, \sigma_x^2) := \left\{ x \in R^n : x \in \Sigma_k, \Omega \sim U\left(1, \binom{n}{k}\right) \text{ and } x_i \sim N(0, \sigma_x^2)\right\}, \quad (3)$$

where $\Omega = \text{supp}(x) := \{i \in [n] : x_i \neq 0\}$.

We assume the signal is transmitted through an AWGN channel of capacity $C(\sigma_2^2)$ and we measure the end-to-end distortion (D) between the initial (x) and recovered source signal ($\hat{x}$) by the mean squared error (MSE)

$$MSE(x, \hat{x}) := E\left[\frac{1}{n}\|x - \hat{x}\|_2^2\right], \quad (4)$$

and the percentage root-mean-square difference (PRD)

$$PRD(x, \hat{x}) := E\left[\frac{\|\|x - \hat{x}_2}{\|x\|_2}\right]100\%. \quad (5)$$

Signal Acquisition.

AdaptCast follows the random projections and incoherent bases principles to achieve a parsimonious signal representation, similarly to CS. In more detail, assume signal x needs to be transmitted to an intended receiver and let $\Phi \in R^{M \times N}$ be a measurement matrix. If the measurement matrix satisfies the R.I.P. condition for all $x \in \Sigma_k(p)$, where $\delta_k$ is a constant $\in (0,1)$, then only $M = O(k \log N)$ coefficients suffice to reconstruct the initial signal with very high probability. These coefficients are given by the linear operation of $$y = \Phi \cdot x. \quad (6)$$

Each element of y is called a measurement of x. Thus, by only acquiring and communicating M measurements of x, the receiver can decode the initial signal within some desired distortion limits.

Although random projections and CS form an information theoretic suboptimal compression method in terms of rate, it has been widely considered as a candidate method for signal-independent acquisition in resource constrained systems mainly because of its low computational implementation requirements and the fact that several signals typically encountered in WSNs naturally exhibit high sparsity levels. Additional discussion further below provide some fundamental bounds and simulation results, respectively, on the rate distortion performance of AdaptCast.

Signal Transmission.

After the sparse signal has been efficiently represented by the measurements vector (y) and quantized to the appropriate level, a dense constellation of a digital modulation scheme is used to transmit the information across the channel. Standard PHY randomization techniques, such as scrambling and interleaving, and typical PHY FEC schemes usually result in obliviously created modulated symbols. However, AdaptCast does not use any of these techniques, ensuring that measurements' relative amplitude information is preserved across their entire transmission. In particular, the design preserves the relative importance of transmitted bits by using a direct, distance-based mapping rule and a dense constellation of order matching the precision of the transmitted measurements.

Figure 7:
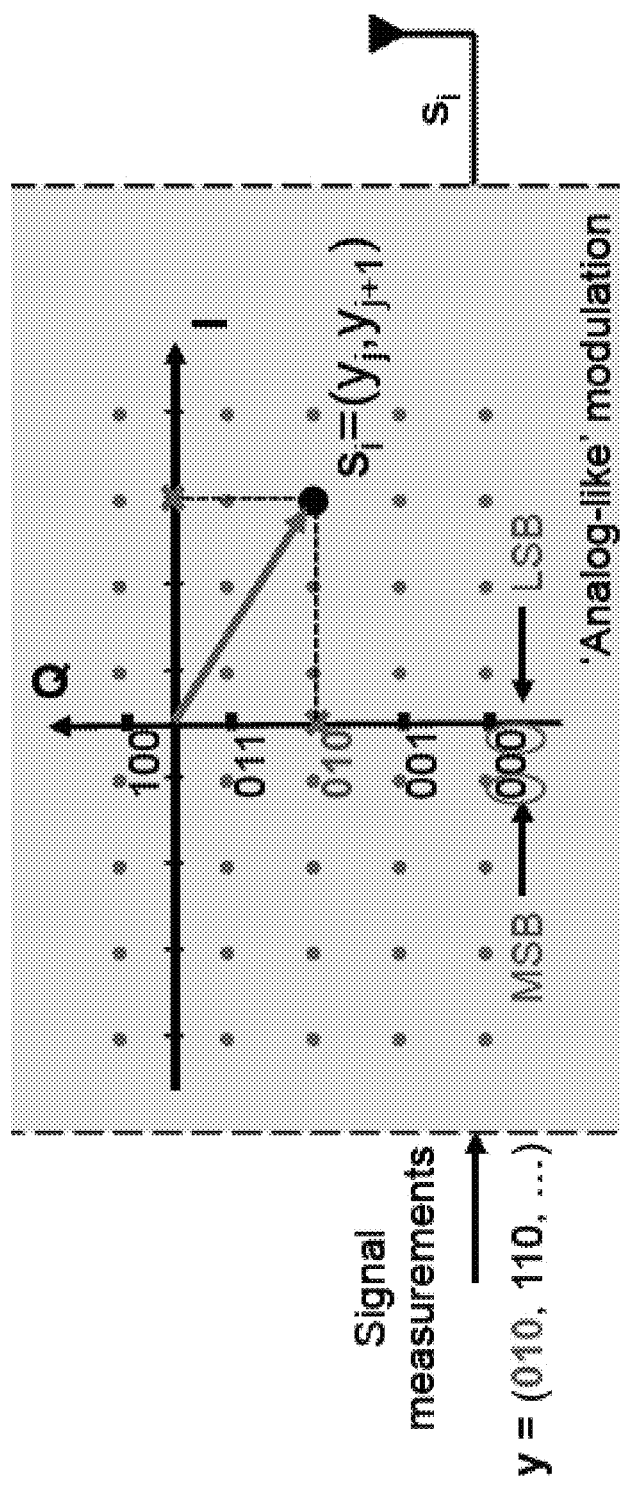
FIG. 7 illustrates an example of a modulation scheme performed by the WSN node of FIG. 5, according to one inventive implementation.

An example of such a transmission approach is shown in FIG. 7. In this example, a QAM modulation scheme is used with a constellation order that enables direct mapping of quantized measurements $y_i$'s to constellation symbols $s_i$'s (it should be appreciated that modulation schemes other than QAM may be employed pursuant to the inventive concepts outlined herein). This property guarantees that additive channel noise and its local perturbations to the transmitted symbols will have minimum effect in terms of distortion which will directly depend on the experienced channel quality, similarly to analog modulation schemes. For instance, if the '011' symbol is transmitted on the Q-axis and noise causes its demodulation as a neighboring symbol, e.g. '100', the absolute value of the error is minimum although three error bits, defined by the conventional BER analysis approach, have occurred. Thus, unlike Gray coding that ensures one bit error between neighboring symbols in the constellation diagram, AdaptCast's direct mapping maintains relative bit significance and provides inherent unequal error protection. This concept is further explained and its performance benefits are explored in the discussion below.

Signal Reconstruction.

At the receiver side, a noise-corrupted signal ($\hat{s}$) is received, demodulated and mapped to an incomplete and noisy set of measurements ($\hat{y}$). The recovery of the reconstructed signal ($\hat{x}$) follows the reverse order of the encoding process and is based on principles of CS reconstruction. An optimization problem, formulated as $$\min_{\hat{\theta}\in R^n} \|\hat{\theta}\|_1, \text{ subject to } \hat{y} = \Phi \cdot \Psi \cdot \hat{\theta}, \qquad (7)$$

where $\hat{x}=\Psi\cdot\hat{\theta}$, provides the sparsest solution that corresponds to the received signal. Numerous convex relaxations, such as basis pursuit (BP) and Dantzig selector, and greedy algorithms, such as matching pursuit (MP) and iterative thresholding methods, have been proposed in the literature with close to optimal performance and strong analytical guarantees. AdaptCast approximates the reconstruction problem of Eq. 7 using an optimized orthogonal matching pursuit (OMP) algorithm, providing a good tradeoff between reconstruction quality and computational complexity. The detailed description and performance results of the reconstruction algorithm are presented below.

Performance Bounds of AdaptCast.

In this section, we examine AdaptCast's rate-distortion performance and compare its performance bounds with the ones of a layered coding scheme. Our analysis considers only strictly-sparse sources, but results can be extended to approximately-sparse sources as well.

Rate-Distortion Performance.

The rate-distortion function of a source provides a fundamental lower bound on the rate (R) required to achieve on average a description of the source with certain reconstruction distortion (D). Closed form expressions of the R(D) function are known for only a limited number of cases with simple source distributions. A Gaussian k-sparse source has a mixed distribution and can be written as the product of a discrete Bernoulli random variable (r.v.), which determines the positions of the non-zero coefficients, and a continuous normal r.v. representing the amplitude. Thus, we can write $$X=V\cdot G \qquad (8)$$

where $V\sim B(p)$ with $p=Pr\{V=1\}\ll 1$ and $G\sim N(0,\sigma_x^2)$. An asymptotic approximation of the R(D) function of $x\in G_k(p,\sigma_x^2)$ is given by Eq. 9 and it can be proved that it is tight in the low distortion regime.

Lemma 1.

The rate-distortion function of $x\in G_k(p,\sigma_x^2)$ can be approximated by $$R(D) \approx h(p) + \frac{p}{2}\log\left(\frac{p\sigma_x^2}{D}\right), \qquad (9)$$

where h(p) is the binary entropy function.

Eq. (9) can be derived by considering a two-step coding approach for source $x\in G_k(p,\sigma_x^2)$. First, the positions of the non-zero coefficients are sequentially encoded, followed by encoding of their magnitude information. This requires h(p) and $$\frac{1}{2}\log\left(\frac{p\sigma_x^2}{D}\right)$$

bits, respectively. In the low distortion regime, this process is shown to be asymptotically optimal.

Performance of Layered Coding Schemes.

Figure 1B:
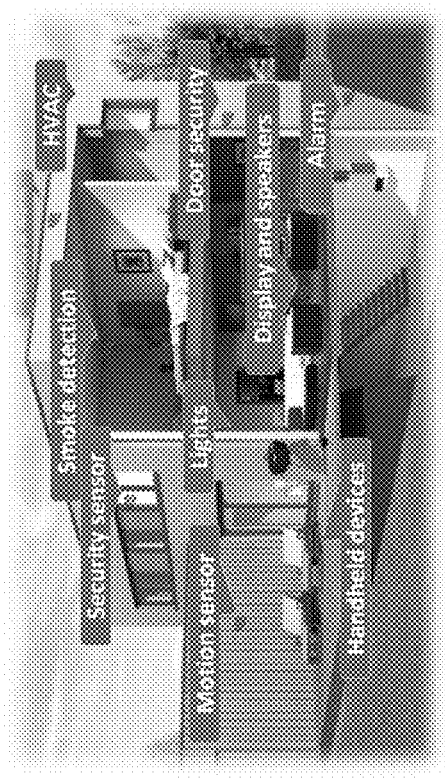
FIGS. 1A through 1D illustrate various examples of Wireless Sensor Networks (WSNs), including a body area network (FIG. 1A), a smart building network (FIG. 1B), a smart city network (FIG. 1C), and an industrial network (FIG. 1D).
Figure 1A:
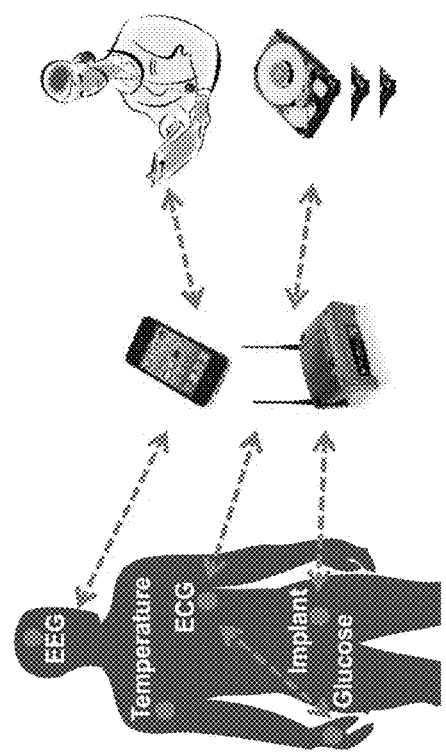
Figure 1D:
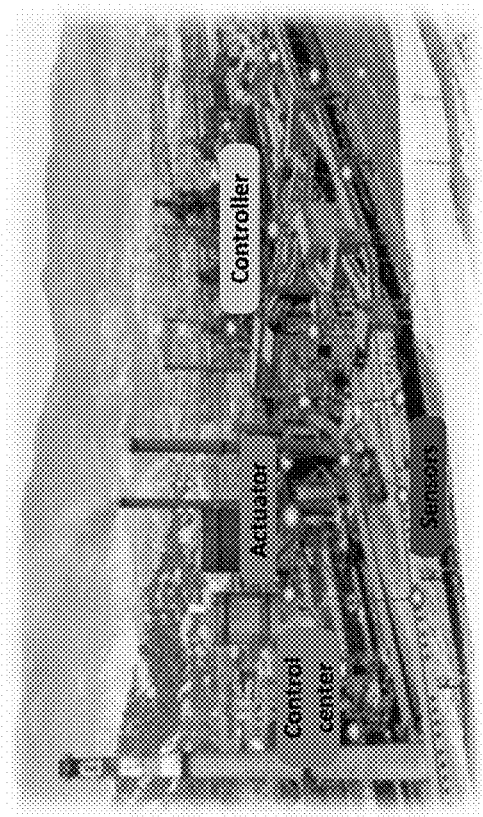
Figure 1C:
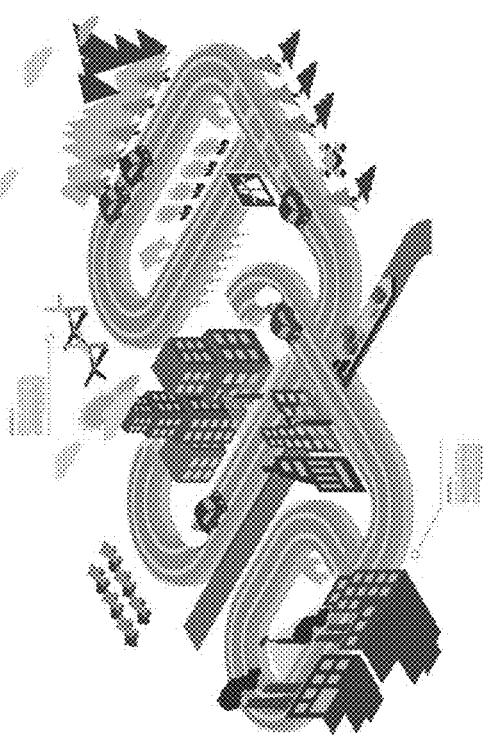
Figure 2:
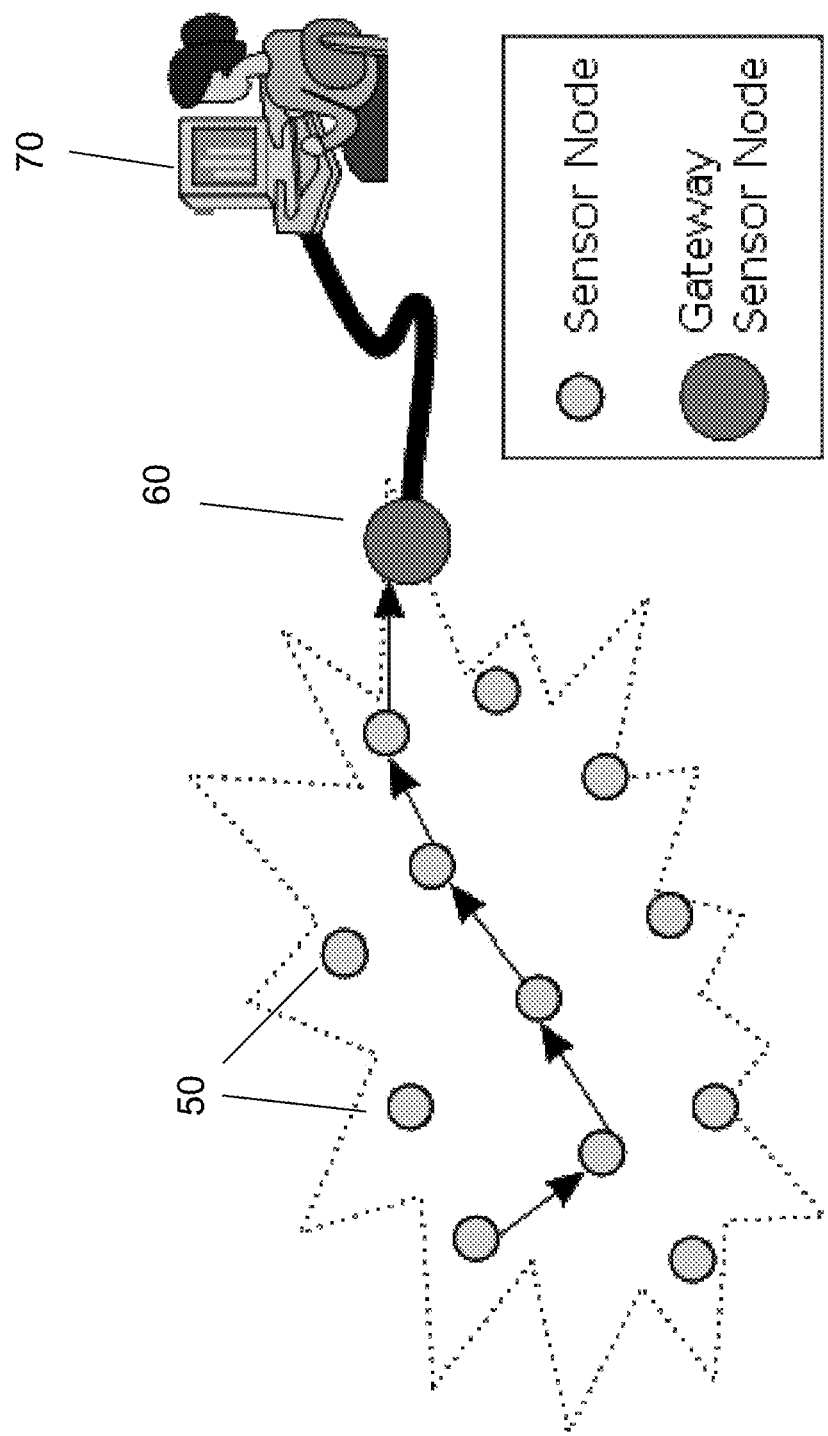
FIG. 2 illustrates a general example of a WSN that includes multiple nodes coupled to a gateway, that is in turn coupled to a central controller or monitoring computer.
Figure 3:
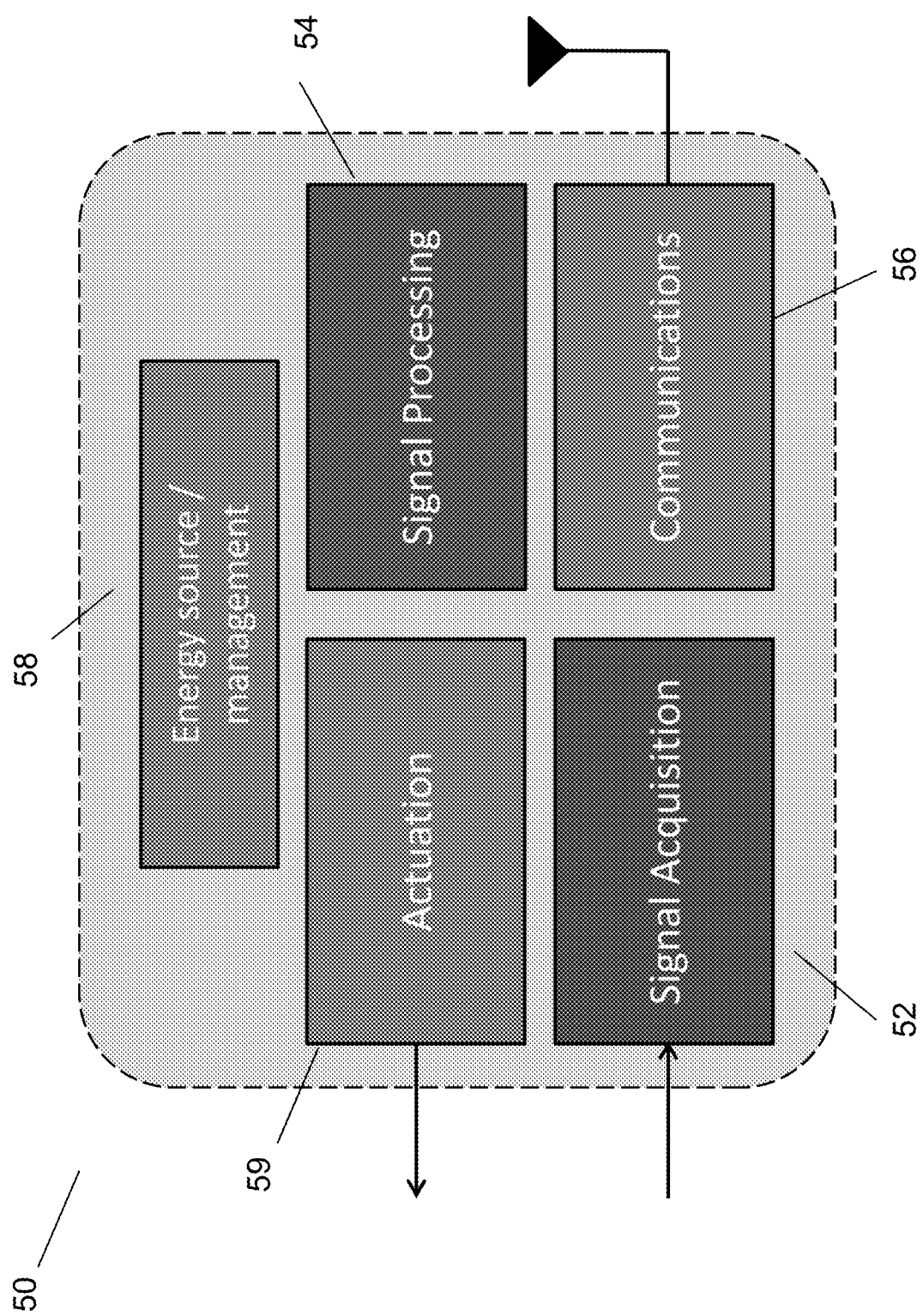
FIG. 3 illustrates a general example of one node of the WSN shown in FIG. 2.
Figure 4:
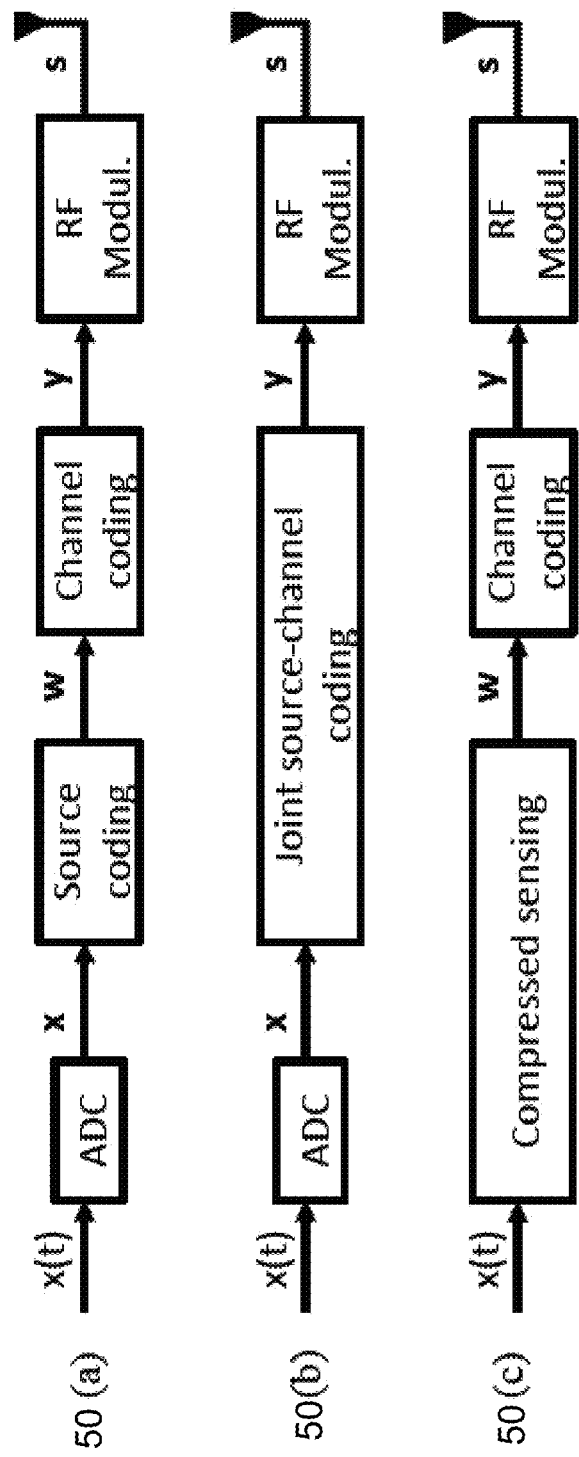
FIG. 4 illustrates, in block diagram format, a comparison of three different conventional approaches for WSN node design to acquire sparse signals, compress the acquired signals, and modulate RF carriers.

According to Shannon's separation theorem, a rate-distortion achieving source code followed by a capacity achieving channel code does not incur any performance penalty on the channel cost-distortion trade off in point-to-point channels, asymptotically. Thus, in layered coding schemes, as shown in FIG. 4 (node 50(a)), a source signal $x\in R^n$ is processed by two independent encoders, sequentially mapping the n-symbol source sequence to an intermediate compressed sequence $w\in R^l$ (l≤n) and then to a channel coded sequence $y\in R^m$ (m≥1) before being mapped to modulated symbols s for channel transmission. This optimal performance in terms of rate-distortion is usually known as optimal performance theoretically attainable (OPTA).

Lemma 2 The optimal performance theoretically attainable (OPTA) by layered coding schemes in terms of distortion ($D_{opta}$) for communicating $x\in G_k(p,\sigma_x^2)$ over an AWGN channel with capacity $C(\sigma_z^2)$ is $$D_{opta} = \frac{p\sigma_x^2 2^{2h(p)/p}}{(1+SNR)^{2/p}}. \qquad (10)$$

Eq. (10) can be derived by considering the requirement that any coding scheme should satisfy in order to achieve reliable transmission $$R(D)\leq C(\sigma_z^2), \qquad (11)$$

where $$C(\sigma_z^2) = \frac{1}{2}\log(1 + SNR) \text{ and } SNR = \frac{\sigma_x^2}{\sigma_z^2}.$$

Thus, the lowest achieved distortion by layered coding schemes ($D_{opta}$), assuming infinite delay and complexity, can be derived by equating R(D) in Eq. 11 with the channel capacity $$R(D_{opta}) = C(\sigma_z^2). \tag{12}$$

Using Lemma 1 and the capacity formula of an AWGN channel, $D_{opta}$ can be achieved.

Performance of Sparse Recovery.

AdaptCast does not make the distinction between source and channel coding, as shown in FIG. 5. It uses a linear encoding function to map the initial source signal to a set of measurements followed by an analog-like modulation scheme to preserve the relative importance of transmitted data. Thus, assuming an AWGN channel of capacity $C(\sigma_z^2)$, the received signal $\hat{y} \in R^1$ is $$\hat{y} = y + z = \Phi x + z, \tag{13}$$

where $\Phi \in R^{n \times m}$ with n≥m and $z_i \sim N(0, \sigma_z^2)$.

The reverse process of the encoder is followed at the decoder, recovering $\hat{x}$ through a demodulation and reconstruction process exploiting the signal's structure $$\hat{x} = D(\hat{y}), \tag{14}$$

where $D(\bullet): R^m \to R^n$. Estimating the initial sparse signal x based on the noisy received signal ($\hat{y}$) is a foremost problem in signal processing and statistics. Considering the linear encoding process given by Eq. (13), fundamental results from estimation theory suggest that multivariate linear regression via least squares can recover the transmitted signal and no other linear reconstruction process can achieve lower average distortion [11]. Since this approach assumes knowledge of the signal support (Ω), it will be called an oracle-assisted reconstruction process, recovering $\hat{x}$. In more detail, the recovered signal is given by $$\hat{x}_{|\Omega} = A_\Omega^\dagger y, \text{ and } \hat{x}_{|\Omega^c} = 0, \tag{15}$$

where $\Omega^c$ denotes the complement of the support set and † the Moore-Penrose pseudo-inverse operator. Even in the absence of knowledge of the signal support, it has been shown that the distortion of the recovered signal can be approached within a logarithmic factor and many practical reconstruction algorithms have been proposed with remarkable performance and robustness. Thus, a bound on the distortion achieved by AdaptCast can be derived and is presented in the following Lemma.

Lemma 3.

Considering the communication of a source signal $x \in G_k(p, \sigma_x^2)$ over an AWGN channel of capacity C(SNR), the minimum achieved distortion by AdaptCast is $$D_{AC} = c\frac{p^2 \sigma_x^2}{SNR}, \tag{16}$$

where c is a constant.

Proof Sketch:

Assuming knowledge of the signal support and appropriate construction of the encoding matrix A so that only the non-zero components are taken into account, the minimum reconstruction distortion would be $$D_{AC} = \frac{1}{n}\frac{\sigma_z^2 k}{\frac{m}{k}}. \tag{17}$$

Substituting k=pn and m=Θ(n) required for successful recovery, we get Eq. (16).

Lemma 3 enables us to prove the main result of this paper, which is the asymptotic optimality of the considered coding approach in the high SNR regime. In the finite SNR regime, it becomes obvious that the distortion of layered coding schemes reduces faster than the distortion of the sparsity-exploiting scheme, based on Eq. (10) and (16).

Theorem 1

In the high SNR regime, the asymptotic performance of AdaptCast in terms of distortion approaches the distortion achieved by capacity achieving layered coding schemes $$\lim_{SNR \to \infty} (D_{opta} - D_{AC}) = 0 \tag{18}$$

Proof Sketch:

In the linear sparsity regime $$\left(\frac{k}{n} = p \xrightarrow{n \to \infty} (0, 1)\right),$$

Eq. (18) can be derived by combining Eq. (10) and (16), and applying basic calculus techniques. In the sublinear regime $$\left(\frac{k}{n} = p \xrightarrow{n \to \infty} 0\right),$$

we substitute $p = c_1 t$ and $$SNR = \frac{c_2}{t},$$

and by letting t→0, we validate Eq. (18).

Signal Reception and Reconstruction.

This section describes AdaptCast's demodulation and signal reconstruction process. Simulation results on the relative bit importance preservation and smooth degradation of signal distortion as channel noise increases are also presented.

"Analog-Like" Modulation/Demodulation

At the receiver, AdaptCast first demodulates the received symbols ($\hat{s}$) using a standard minimum-distance demodulation rule. The modulation properties, i.e. modulation type and constellation order, are agreed with the transmitter once and remain fixed during the signal transmission. The demodulated symbols are parsed and directly mapped to received signal coefficients ($\hat{y}$), following the reverse process described above. The described pipeline is a linear system which ensures channel noise is strictly additive and relative bit-importance is preserved, as opposed to typical modulation pipelines used in state-of-the-art WSNs, in which oblivious creation of modulated symbols destroys the relative bit-importance information.

Figure 8:
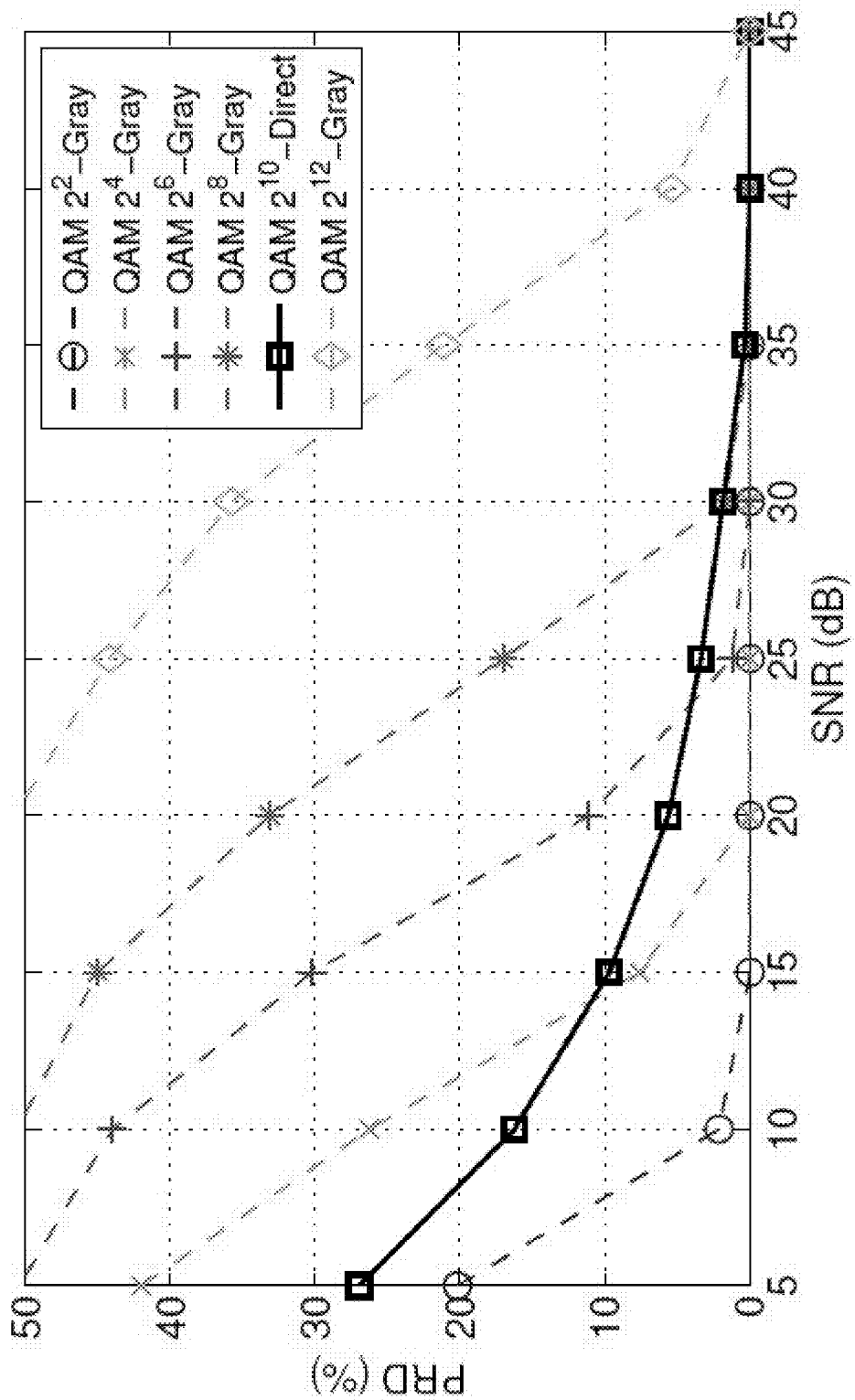
FIG. 8 is a graph illustrating the comparative effect on received signal distortion of different constellation orders using Gray coding, and the direct mapping employed by the WSN node of FIG. 5, according to one inventive implementation.

Contrary to many applications, such as transmission of big digital files over wireless backhaul links, which have strict distortion requirements usually expressed by specific BER thresholds, several WSNs applications can tolerate some end-to-end distortion. This implies that BER is not always the most efficient and representative metric to quantify and optimize for the performance of any communication system, especially when there are soft distortion constraints. AdaptCast's transmission paradigm, including the modulation/demodulation step, is specifically designed to efficiently support the soft transmission of signals in WSNs and achieve a smoothly degrading performance with respect to the channel noise. This is demonstrated by an experiment in which a signal is randomly generated, quantized in five bits and transmitted through an AWGN channel. Two different constellation mapping approaches are compared: a Gray mapping and AdaptCast's direct mapping. FIG. 8 shows the performance of the two approaches measured by PRD(y, ŷ). AdaptCast's direct mapping ensures a significantly smoother increase in the distortion as the SNR decreases due to the relative bit-importance preservation.

Figure 9:
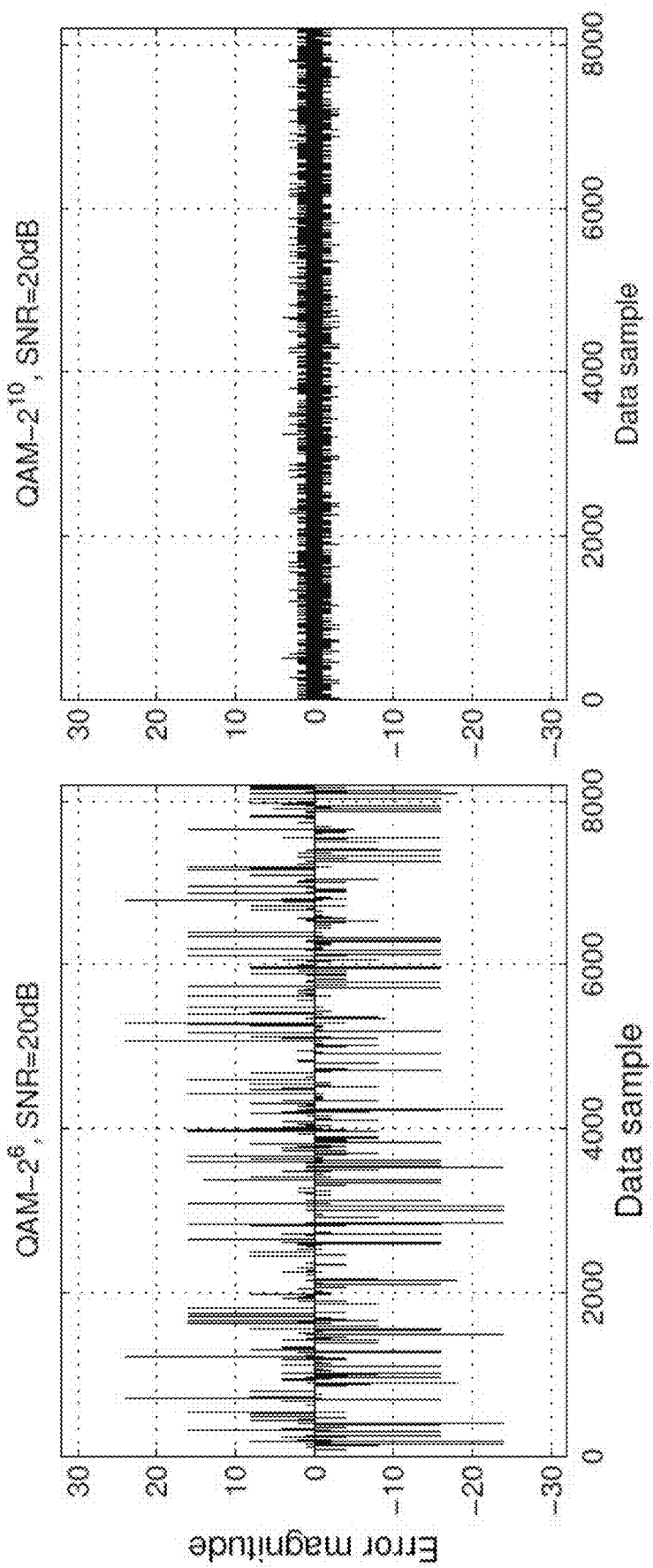
FIG. 9 is a graph illustrating the comparative magnitudes of error in received samples using different modulation order and mapping approaches represented in FIG. 8.

The same result can be better visualized by examining not only the frequency of errors but also their magnitude. FIG. 9 plots the error magnitude between transmitted and demodulated samples:

$$\delta_i = y_i - \hat{y}_i. \qquad (19)$$

Figure 10:
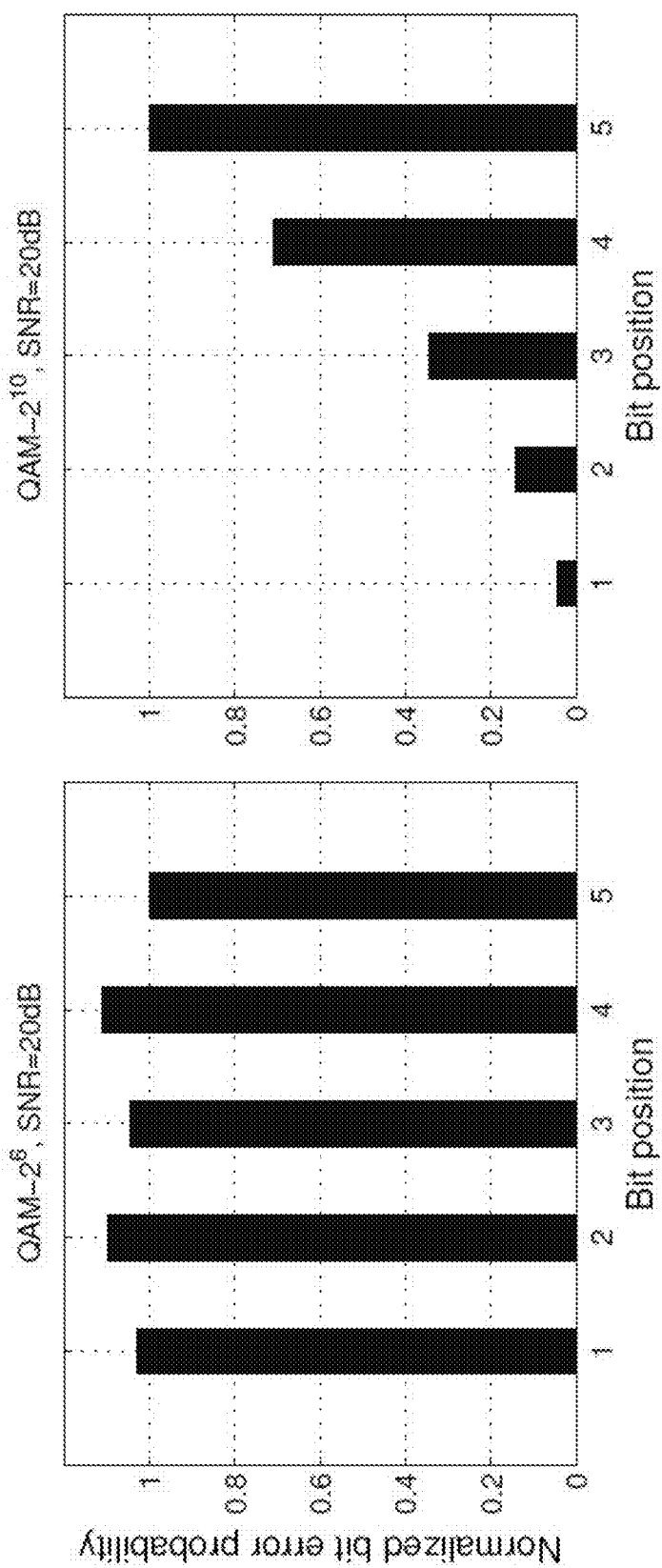
FIG. 10 illustrates the normalized distribution of errors in each bit position for the received samples represented in FIG. 9.

This corresponds to two lines of FIG. 8 for a specific SNR value. It can be seen that, although the frequency of erroneous symbols is higher in the denser (second) constellation because of the decreased distance of neighboring symbols, the error magnitude takes significantly smaller values compared to the first constellation. This happens because of the inherent unequal error protection of AdaptCast's "analog-like" modulation/demodulation and direct mapping. The distribution of the normalized error probability with respect to bit location and importance is shown in FIG. 10, in which bit-1 and bit-5 correspond to MSB and LSB, respectively.

Signal Reconstruction.

AdaptCast uses a dense constellation with symbols having small distances from their neighboring ones but channel noise affects mainly their LSBs, as shown above. Numerous signal denoising methods have been proposed in the literature, successfully suppressing unwanted noise in captured or received signals. The vast majority of these techniques are application specific, making use of precise signal features to identify and separate noise. BP, OMP, ROMP and CoSaMP are some widely used reconstruction methods, each of them with different reconstruction quality and computational complexity. However, since AdaptCast targets a wide range of WSNs applications, an innovative signal-agnostic method is used based on sparse signal recovery principles.

Figure 11:
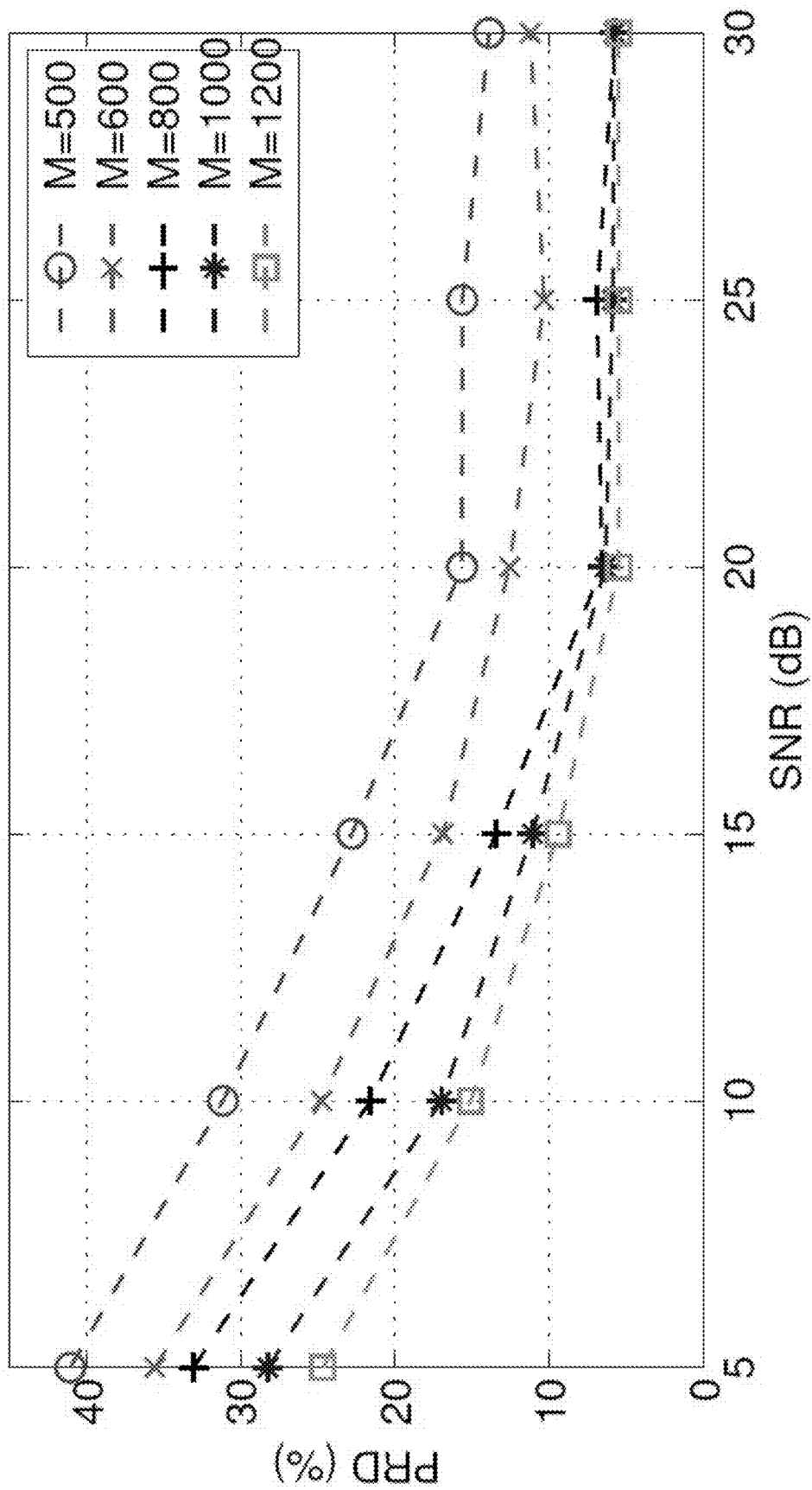
FIG. 11 is a graph illustrating distortion of a reconstructed ECG signal transmitted through an AWGN channel in terms of its SNR, according to one inventive implementation.

AdaptCast uses an OMP-based algorithm, mainly because of its robustness in the presence of noise and relatively low computational requirements. FIG. 11 shows the reconstruction distortion of the algorithm for an electrocardiogram (ECG) signal transmitted through an AWGN channel, parameterized by the number of measurements (M), or equivalently, the compression ratio. It can be seen that the reconstruction algorithm performs well across a wide range of SNR values and efficiently increases robustness of transmitted data. AdaptCast's acquisition process not only results in a parsimonious signal representation but also in increased data reliability by enabling the reconstruction algorithm to leverage the signal structure and suppress the added channel noise.

Performance Evaluation

This section demonstrates AdaptCast's applicability in a wide range of typical WSNs applications. In addition, it evaluates its performance in the context of a health monitoring application against two layered coding schemes.

Signal Independent Operation

AdaptCast's acquisition, transmission and reconstruction process is signal agnostic without requiring knowledge or being tailored to a detailed signal model. This is in contrast with the majority of WSN protocols and systems which employ signal dependent acquisition, compression and decompression techniques. AdaptCast supports interoperability among different applications and could potentially contribute to a universal scheme for WSNs.

Figure 12:
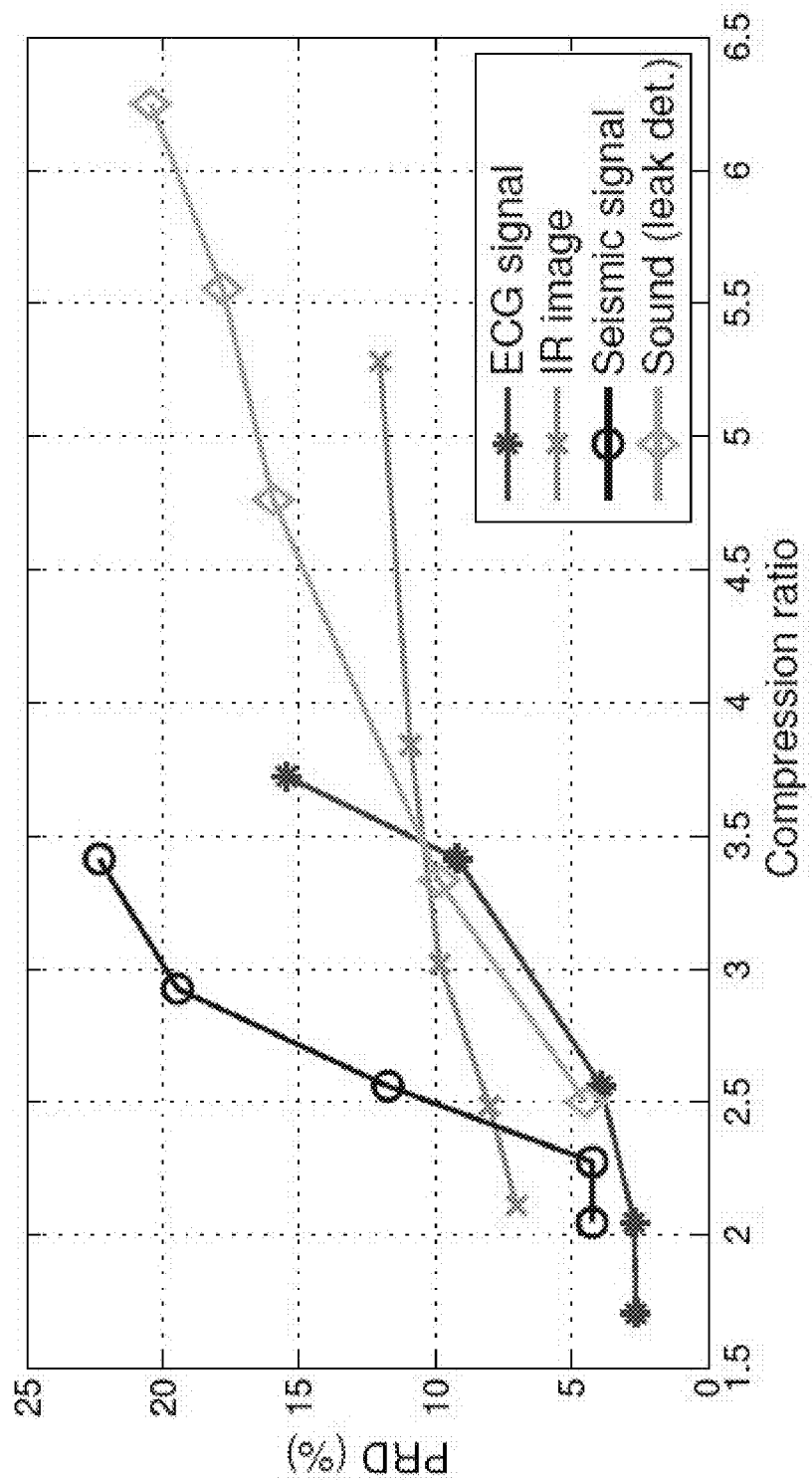
FIG. 12 is a graph illustrating the performance of the WSN node of FIG. 5, according to one inventive implementation, for four different signals encountered in typical WSN applications.

The end-to-end distortion achieved by AdaptCast depends on the signal sparsity and the experienced channel quality, which do not need to be known in advance. FIG. 12 shows AdaptCast's representation and reconstruction performance using signals typically encountered in WSNs. More specifically, an ECG signal from MIT-BIH arrhythmia database, images from a thermal camera, seismic data, and a hydraulic pressure signal from underwater pipe leak detection systems are used. As expected, every signal has its own information rate and as the compression ratio increases, representing the signal with fewer coefficients, the distortion increases as well. However, the figure shows that AdaptCast follows the rate distortion trade off for all signals in a universal manner, regardless of their signal model and sparsity levels.

Compared Approaches.

We compare AdaptCast against two layered coding schemes that follow Shannon's separation theorem in the context of a health monitoring application. We assume that a captured biosignal is transmitted from a sensor node to a receiving hub using an ARQ protocol and we examine the achieved reliability and distortion performance. More specifically, we use an ECG signal which is sampled at 360 Hz, quantized in 8 bits and processed in blocks of 2048 samples, and transmitted through a slow fading channel.

The first layered scheme estimates the channel quality using feedback information contained in the acknowledgment frames and adjusts the transmission rate every fifth transmitted packet based on a lookup table rate adaptation mechanism. We call this scheme "baseline," as opposed to the second scheme which we call it "genie-aided" scheme. The rate selection in the genie-aided scheme is performed by an ideal genie having access to perfect and instantaneous CSI, always making the optimal, per-packet rate selection. Both schemes use a lossy ECG compression scheme of a wavelet transformation with adaptive coefficients thresholding. A BCH code supporting two coding rates of (63,30) and (63,51) is used as the channel coding method, and QAM schemes of three constellation orders (QAM-$2^2$, QAM-$2^4$ and QAM-$2^6$) are used for signal modulation.

AdaptCast operates in a rateless fashion without relying on feedback information. Its system parameters are optimized once for the specific application, providing the best balance between compression performance, resilience against channel noise and reconstruction distortion. In our experiments, the number of measurements (M) is 800 and a QAM-$2^{12}$ modulation scheme is used. Unlike the genie-aided and baseline scheme, AdaptCast does not require CSI. Although the reduced feedback information is a salient design property of AdaptCast that can lead to significant performance gains, it is not quantified in the comparison results of this work, since we want to decouple any advantage associated with improved feedback mechanisms from benefits related to the novel transmission method.

Performance Comparison.

Figure 13:
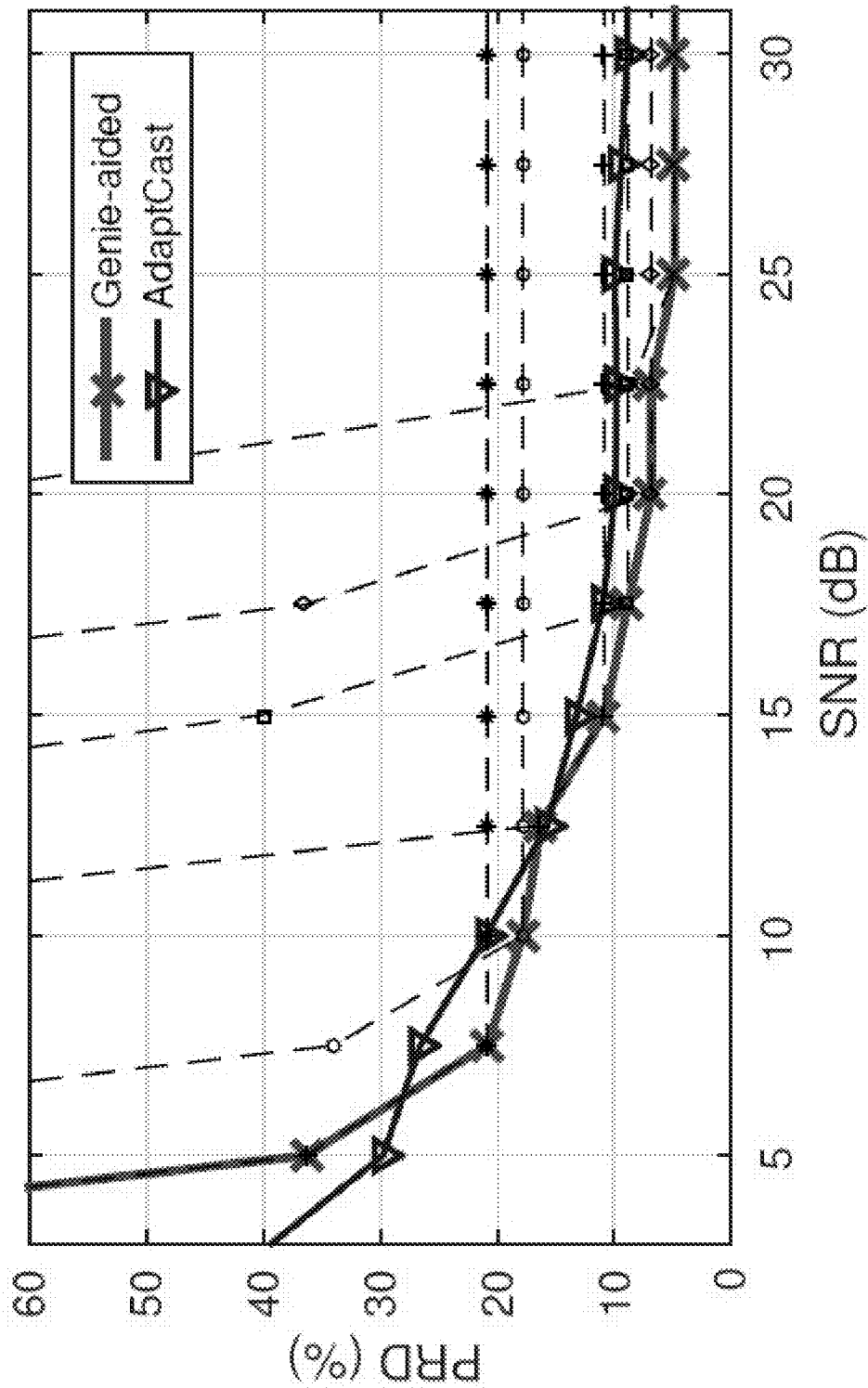
FIG. 13 is a graph illustrating a comparison of reconstruction distortion in terms of channel SNR for a conventional "genie-aided" scheme and the techniques performed by the WSN node of FIG. 5, according to one inventive implementation.

The performance of AdaptCast and genie-aided scheme is shown in FIG. 13. The six different rate configurations of the genie-aided scheme correspond to the dashed lines of the graph and all exhibit similar "threshold effect" behavior; they perform well above a given SNR value but have a rapid performance degradation below that. As expected, lower coding rates and smaller constellations correspond to smaller threshold SNR values. Assuming the existence of the genie and the selection of the highest possible transmission rate which results in the lowest distortion, the performance of the genie-aided scheme is the lower envelope of all coding rates. For instance, at a SNR of 20 dB the idealized scheme uses QAM-$2^6$ and BCH (63,30) since a choice of the higher coding rate would result in excessive distortion and the lower rate would lead to unnecessary use of resources, e.g. power and bandwidth.

AdaptCast performs very close to the genie-aided scheme, without access to any CSI. In the high SNR regime, the additional distortion is due to the sparse reconstruction algorithm. As the SNR decreases, AdaptCast's distortion is smoothly increasing resulting in a graceful degradation of the reconstruction quality as the channel noise increases. This is achieved by the preservation of the relative bit importance and the direct mapping of signal amplitude information to modulated symbols.

Figure 14:
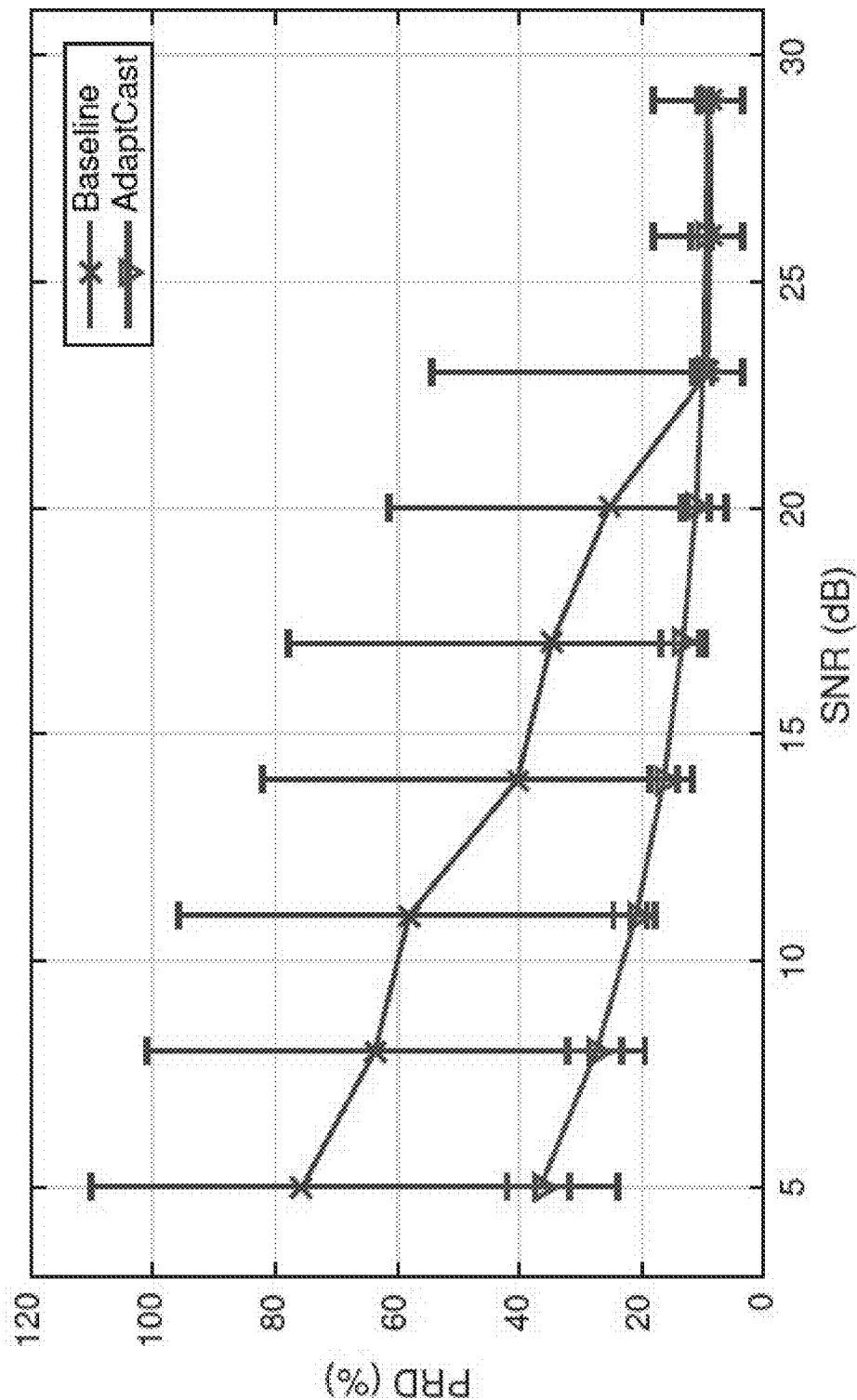
FIG. 14 is a graph illustrating a comparison of reconstruction distortion in terms of channel SNR for a conventional "baseline" scheme and the techniques performed by the WSN node of FIG. 5, according to one inventive implementation.

FIG. 14 captures the deleterious effect of SNR fluctuations on the performance of layered schemes in the absence of instantaneous CSI. In more detail, the fading channel causes significant performance degradation of the baseline scheme with a considerable standard deviation, as shown by the error bars. In contrast, AdaptCast exhibits a smooth distortion increase with the channel SNR and small deviations around the mean PRD values. Compared to the baseline scheme, for a target PRD of 30%, AdaptCast performs better by approximately 10 dB.

Apart from the good performance in point-to-point scenarios, the WSN node 100 of FIG. 5, implementing the various functionalities described herein referred to as AdaptCast, offers significant advantages in multiuser settings in WSNs. For instance, considering a broadcasting scenario, a sensor node using the predominant layered schemes for WSNs would transmit in the lowest rate corresponding to the receiver with the worst channel. This could significantly limit the overall performance. However, because of its analog-like modulation and rateless coding method, AdaptCast can instead achieve transmission information rate to each node commensurate with their individual channel quality and without requiring feedback information.

CONCLUSION

In sum, disclosed herein are methods and apparatus to implement an application-independent integrated source representation-to-transmission scheme for efficient communication of captured sparse signals in WSNs. These methods and apparatus leverage sparsity existing in many physical signals to parsimoniously represent them and, by preserving their relative bit importance during transmission, it achieves graceful tradeoff between distortion and channel SNR. According to simulations results, it performs close to a genie-aided layered scheme with perfect CSI in a point-to-point scenario and its benefits can be naturally extended in multiuser scenarios.

The disclosed methods and apparatus do not introduce any computational intense algorithm in the transmitting sensor nodes, limiting its encoding process to a linear operation and pushing most of the system's complexity to the receiver's side. The required dense constellations impose relatively strict specifications on the RF components, such as linearity and phase noise requirements, but these may be met, for example, by commercial transceivers in SDR platforms.

While various inventive embodiments have been described and illustrated herein, those of ordinary skill in the art may envision, with the benefit of this disclosure, a variety of other means and/or structures for performing the function and/or obtaining the results and/or one or more of the advantages described herein, and each of such variations and/or modifications is deemed to be within the scope of the inventive embodiments described herein. More generally, those skilled in the art should appreciate that all parameters, dimensions, materials, and configurations described herein are meant to be exemplary and that the actual parameters, dimensions, materials, and/or configurations may depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented primarily by way of example and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways, for example, using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embodied in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A wireless sensor node, comprising:
an analog-to-digital converter (ADC) to sample a sparse analog signal representing at least one sensed condition and generate a plurality of digital samples;
a controller, coupled to the ADC, to receive and process the plurality of digital samples by:
   A) applying a transformation to a first number N of the plurality of digital samples to provide a second number M of measurement coefficients, wherein:
      the first number N of the plurality of digital samples comprise a first total number of bits; and
      the second number M of the plurality of measurement coefficients comprise a second total number of bits less than the first total number of bits;
   B) mapping the M measurement coefficients to respective constellation points of a modulation constellation having an order that is based on each of the M measurement coefficients so as to generate a succession of modulation symbols corresponding to the respective constellation points; and
   C) modulating a phase and/or a frequency of a carrier wave, having a carrier frequency in a wireless communication spectrum, according to the succession of modulated symbols to generate an encoded carrier wave representing the sparse analog signal; and
a communication interface, coupled to the controller, to transmit the encoded carrier wave generated in C).

2. The wireless sensor node of claim 1, wherein A) comprises applying a linear transformation to the first number N of the plurality of digital samples to provide the second number M of measurement coefficients.

3. The wireless sensor node of claim 1, wherein:
in A), each digital sample of the first number N of the plurality of digital samples has a first number $b_1$ of bits;
in A), each measurement coefficient of the second number M of the plurality of measurement coefficients has a second number $b_2$ of bits; and
in B), the order of the modulation constellation is based on the second number $b_2$ of bits of each of the M measurement coefficients.

4. The wireless sensor node of claim 3, wherein in A), $M<N$ and $M*b_2<N*b_1$.

5. The wireless sensor node of claim 4, wherein in A), $b_2<b_1$.

6. The wireless sensor node of claim 3, wherein the modulation constellation is a QAM constellation.

7. The wireless sensor node of claim 6, wherein in B), the order of the QAM constellation is $(2^{b_2})^2$.

8. The wireless sensor node of claim 6, wherein in B), adjacent pairs of the M measurement coefficients are mapped to one constellation point of the QAM constellation to generate the succession of QAM symbols.

9. The wireless sensor node of claim 8, wherein a number of QAM symbols is M/2.

10. The wireless sensor node of claim 8, wherein in B):
the M measurement coefficients are represented as a vector $[y_j]$, $j=1 \ldots M$;
the QAM symbols are represented as $S_i$, $i=j \ldots (M-1)$; and
each QAM symbol $S_i$ corresponding to one constellation point of the respective constellation points is defined as $S_i=(y_{2i-1}, y_{2i})$.

11. The wireless sensor node of claim 1, wherein the sparse analog signal represents an electrocardiogram (ECG) signal, at least one image from a thermal camera, seismic data, or hydraulic pressure from an underwater pipe leak detection system.

12. A wireless sensor network, comprising:
a plurality of wireless sensor nodes according to claim 1;
a central controller to receive information from at least some of the plurality of wireless sensor nodes; and
at least one gateway node to couple the plurality of wireless sensor nodes to the central controller,
wherein the wireless sensor network is a body area network, a smart building network, a smart city network, or an industrial network.

13. A wireless sensor node, comprising:
an analog-to-digital converter (ADC) to sample a sparse analog signal representing at least one sensed condition and generate a plurality of digital samples; and
a controller, coupled to the ADC, to receive and process the plurality of digital samples to represent the digital samples as a succession of modulation symbols, wherein:
   the succession of modulation symbols preserves a relative bit importance of respective digital samples of the plurality of digital samples; and
   the controller modulates a carrier wave according to the succession of modulated symbols to generate an encoded carrier wave representing the sparse analog signal.

14. The wireless sensor node of claim 13, wherein the controller:
   A) applies a transformation to the plurality of digital samples to provide a plurality of measurement coefficients; and
   B) maps the plurality of measurement coefficients to respective constellation points of a modulation constellation so as to generate the succession of modulation symbols corresponding to the respective constellation points.

15. The wireless sensor node of claim 14, wherein:
the plurality of digital samples comprise a first total number of bits; and
the plurality of measurement coefficients comprise a second total number of bits less than the first total number of bits.

16. The wireless sensor node of claim 13, wherein:
the plurality of digital samples comprise a first number N of digital samples;
the plurality of measurement coefficients comprise a second number M of measurement coefficients; and
$M<N$.

17. The wireless sensor node of claim 13, wherein the controller modulates a phase and/or a frequency of the carrier wave to generate the encoded carrier wave representing the sparse analog signal.

18. The wireless sensor node of claim 17, wherein:
the modulation constellation is a QAM constellation; and
an order of the QAM constellation is based on a precision of each measurement coefficient of the plurality of measurement coefficients.

19. The wireless sensor mode of claim 14, wherein:
the plurality of digital samples comprise a first total number of bits;

the plurality of measurement coefficients comprise a second total number of bits less than the first total number of bits;

the plurality of digital samples comprise a first number N of digital samples;

the plurality of measurement coefficients comprise a second number M of measurement coefficients; and

M<N.

20. The wireless sensor node of claim 13, wherein the sparse analog signal represents an electrocardiogram (ECG) signal, at least one image from a thermal camera, seismic data, or hydraulic pressure from an underwater pipe leak detection system.

21. A wireless sensor network, comprising:

a plurality of wireless sensor nodes according to claim 13;

a central controller to receive information from at least some of the plurality of wireless sensor nodes; and at least one gateway node to couple the plurality of wireless sensor nodes to the central controller, wherein the wireless sensor network is a body area network, a smart building network, a smart city network, or an industrial network.

22. A method for transforming a sparse analog signal representing at least one sensed condition for transmission in a wireless sensor network, the method comprising:

A) sampling the sparse analog signal to generate a plurality of digital samples;

B) processing the plurality of digital samples to represent the digital samples as a succession of modulation symbols, wherein the succession of modulation symbols preserves a relative bit importance of respective digital samples of the plurality of digital samples; and C) modulating a carrier wave according to the succession of modulated symbols to generate an encoded carrier wave representing the sparse analog signal.

23. The method of claim 22, wherein B) comprises:

B1) applying a transformation to the plurality of digital samples to provide a plurality of measurement coefficients; and B2) mapping the plurality of measurement coefficients to respective constellation points of a modulation constellation so as to generate the succession of modulation symbols corresponding to the respective constellation points.

24. The method of claim 22, wherein:

the plurality of digital samples comprise a first total number of bits; and the plurality of measurement coefficients comprise a second total number of bits less than the first total number of bits.

25. The method of claim 22, wherein:

the plurality of digital samples comprise a first number N of digital samples;

the plurality of measurement coefficients comprise a second number M of measurement coefficients; and

M<N.

26. The method of claim 22, wherein C) comprises:

modulating a phase and/or a frequency of the carrier wave to generate the encoded carrier wave representing the sparse analog signal.

27. The method of claim 26, wherein:

the modulation constellation is a QAM constellation; and an order of the QAM constellation is based on a precision of each measurement coefficient of the plurality of measurement coefficients.

28. The method of claim 22, wherein:

the plurality of digital samples comprise a first total number of bits;

the plurality of measurement coefficients comprise a second total number of bits less than the first total number of bits;

the plurality of digital samples comprise a first number N of digital samples;

the plurality of measurement coefficients comprise a second number M of measurement coefficients; and

M<N.

29. The method of claim 22, wherein the sparse analog signal represents an electrocardiogram (ECG) signal, at least one image from a thermal camera, seismic data, or hydraulic pressure from an underwater pipe leak detection system.

* * * * *